(12) United States Patent
Weddendorf

(10) Patent No.: US 11,131,288 B2
(45) Date of Patent: Sep. 28, 2021

(54) HORIZONTAL AXIS PI-PITCH WATER TURBINE WITH REDUCED DRAG

(71) Applicant: WEDDENDORF DESIGN, INC., Huntsville, AL (US)

(72) Inventor: Bruce Weddendorf, Huntsville, AL (US)

(*) Notice: Subject to any disclaimer, the term of this patent is extended or adjusted under 35 U.S.C. 154(b) by 0 days.

(21) Appl. No.: 17/040,768

(22) PCT Filed: Mar. 8, 2019

(86) PCT No.: PCT/US2019/021268
§ 371 (c)(1),
(2) Date: Sep. 23, 2020

(87) PCT Pub. No.: WO2019/194929
PCT Pub. Date: Oct. 10, 2019

(65) Prior Publication Data
US 2021/0003110 A1    Jan. 7, 2021

Related U.S. Application Data

(60) Provisional application No. 62/651,864, filed on Apr. 3, 2018.

(51) Int. Cl.
*F03B 13/26* (2006.01)
*F03B 17/06* (2006.01)

(52) U.S. Cl.
CPC ......... *F03B 13/264* (2013.01); *F03B 17/067* (2013.01); *F05B 2220/7068* (2013.01); *F05B 2240/14* (2013.01); *F05B 2240/93* (2013.01); *F05B 2260/79* (2013.01)

(58) Field of Classification Search
CPC .............. F03B 13/264; F03B 17/067; F05B 2220/7068; F05B 2240/14; F05B 2240/93; F05B 2260/79
See application file for complete search history.

(56) References Cited

U.S. PATENT DOCUMENTS

| 8,354,758 B1 | 1/2013 | Boschma |
| 2010/0237626 A1 | 9/2010 | Hamner |
| 2011/0076144 A1 | 3/2011 | Lucas |

(Continued)

FOREIGN PATENT DOCUMENTS

| CH | 708367 A2 | 1/2015 |
| DE | 3606549 A1 | 9/1987 |

(Continued)

OTHER PUBLICATIONS

International Search Report for PCT/US19/21268 dated May 13, 2019, 2 Pages.

(Continued)

*Primary Examiner* — Sean Gugger
(74) *Attorney, Agent, or Firm* — Dowell & Dowell, P.C.

(57) ABSTRACT

Substantially horizontal axis water turbine assemblies for generating electrical power in areas having poor sources of water flow including rotors mounted within housings in such a manner so as to minimize water resistance to the rotor blades with rotor blades passing through upper rotor return air spaces created within the housings and wherein the turbine assemblies may be mounted within support structures that both channel water flow to the turbine assemblies and facilitate access to the components thereof.

19 Claims, 26 Drawing Sheets

(56) References Cited

U.S. PATENT DOCUMENTS

2013/0026761 A1 1/2013 Rajadhyaksha
2014/0356163 A1 12/2014 Schwaiger

FOREIGN PATENT DOCUMENTS

DE 102011014085 A1 9/2012
WO 8501780 A1 4/1985
WO 2006016360 A2 8/2004
WO 2016059118 A1 4/2016

OTHER PUBLICATIONS

Written Opinion of the International Searching Authority for PCT/US19/21268 dated May 13, 2019, 3 Pages.

HORIZONTAL AXIS PI-PITCH WATER TURBINE WITH REDUCED DRAG

BACKGROUND OF THE INVENTION

Field of the Invention

The present invention relates to horizontal axis Pi-Pitch water turbines and more particularly to such turbines that are design and constructed to be operative in areas having poor water resources that have low water flow velocity or where a vertical water drop is not sufficient for operating conventional turbines. The turbines of the invention are able to function in low head pressure applications as low as one meter and feature reduced drag from returning turbine rotor blades such that the turbines operate with greater efficiency. The turbine assemblies may also be selectively and interchangeably mounted within a plurality of different water channeling structures so as to be functional in many environments to produce electrical energy from flowing water.

Brief Description of the Related Art

Pi-Pitch turbines are used to extract energy from moving water when the flow stream to the turbines is either shallow or moves relatively slowly, as down a gradual slope, or under the influence of tides, as opposed to other types of turbines which are more efficient at extracting energy from fast-moving water streams created by relatively high vertical drops, as conventionally used in large hydroelectric installations wherein dams are required to provide a source of elevated water supply. There are many drawbacks of large hydroelectric installations such as the restriction of natural water flow along a river or other tributary, the need to manage water flow relative to a dam depending on changes in water flow, such as when flooding conditions are experienced, in order to protect a dam and hydroelectric equipment as well as downstream areas and structures from being flooded should a dam failure occur. Further, the use of dams prevents the natural movement of fish and other aquatic creatures and wildlife and thus there can be adverse consequences to nature and wildlife that must be addressed.

Pi-pitch turbines allow power to be obtained from waterways without blocking water flow thereby having much less adverse environmental impact along such waterways. Further, there are many areas wherein water supplies, including rivers and streams, may be limited and wherein any interruption of water flow could be a significant problem for downstream areas. Pi-pitch turbines are more suitable for use in such areas.

However, the pi-pitch turbines built to date suffer from relatively high drag created by their fixed central axle crossing through the middle of the turbines, as well as the drag created from returning blades of a turbine rotor if the turbine is deployed in a fully-flooded installation. The returning blades being the blades moving opposite to the direction of water flow through the turbine rotor. Timing mechanisms required to control positions of the rotor blades are constantly moving through the water stream in conventional pi-pitch turbines, thereby adding additional drag.

In view of the foregoing, there is a need to provide a pi-pitch turbine that can be used in shallow and/or slowly moving waterways, rivers or streams, tidal areas, in canals including water irrigation canals, water treatment outflows and the like and which overcome the problems of drag forces on returning rotor blades and the timing mechanisms for controlling the positions of the blades as the turbine rotor rotate.

SUMMARY OF THE INVENTION

This invention is directed to configurations for horizontal axis pi-pitch turbines which include a sealed, air-filled overhead chamber into which the returning blades of a rotor assembly enter as they rotate back against the flow of water which is only below the returning blades. In this manner, the returning blades travel through air rather than water, thereby, greatly reducing drag on the turbine rotor. Additionally, in one embodiment of the invention, the turbine does not require a central axle shaft to keep opposite side plates of the rotor in alignment, as timing of the rotation of each side plates is accomplished by a separate idler shaft placed above the turbine rotor, spanning across and connected to opposite side plate housings by toothed timing belts or chains. In this embodiment, the timing mechanisms are enclosed in sealed chambers of the side plate housings on each side of the rotor assembly and are kept flooded with water, which rotates along with the turbine rotor, thereby further reducing drag.

To this end, the horizontal axis Pi-Pitch water turbine of the present invention includes a turbine rotor having opposite side plate housings between which are mounted a plurality of blades that rotate relative to the side plates housings as the rotor is rotated about a horizontal axis of the rotor in a direction generally perpendicular or normal to the direction of water moving through the turbine rotor.

In the embodiments of the invention, the rotation of each of the turbine rotor blades is controlled by a timing belt system mounted within each side plate housing. The opposite ends of each rotor blade are connected to rotate with a pair of timing pulleys within the side plate housings. The timing pulleys have a first number of teeth that are engaged by teeth on one side of a timing belt that is enclosed within a side plate housing. The timing belt drivingly engages with each of the timing pulleys within one of the side plate housings and the timing belt serves to time the blade rotation relative to the turbine, and another toothed belt or chain exterior to the turbine serves to connect both side plates in rotational time with each other, through an idler shaft that crosses above the turbine. These outside belts or chains also serve to extract torque from the turbine to power the electric generator.

In another embodiment of the invention, as opposed to driving a conventional generator unit driven by belts from an idler shaft, a direct drive multipole magnetic generator can be formed from the turbine rotor and housing of the turbine. In this embodiment, a large number of spaced permanent magnets are attached to outer peripheral edges of the rotor end plates on opposite ends of the rotor blades. To complete the generator, a large number of electro-magnetic coils wound with magnet wire sealed in water proof windings cast over toothed poles of a laminated soft iron segmented stator are mounted to the flow directing water directing inlet and out liners spaced to interact with the magnets on the rotor. These stator segments can be added all the way around, or partially around the flow guide liners. As the rotor rotates relative to the flow directing housing, electrical energy is generated by the permanent magnets moving relative to the stator windings.

In further accordance with the invention, the turbine assemblies are preferably designed and constructed so as to the easily mounted to and interchangeably retained within a plurality of difference flow channeling structures. Thus, the turbine assemblies may be used in many types of natural and man-made water flow channels, including water treatment plant outflows, irrigation canals, natural rivers and streams, and areas with rapid tidal flows either mounted to the sea bed or as part of a floating barge anchored in a body of moving water.

BRIEF DESCRIPTION OF THE DRAWINGS

A better understanding of the invention will be had with reference to the accompanying drawings wherein:

FIG. 21 is a front perspective view of a weir structure mounted within a water channel wherein the turbine assembly of FIG. 1 is mounted within a retainer portion of the weir between inlet and outlet openings in the weir structure so that water is directed through the rotor of the turbine assembly to create a venturi flow there through.

DESCRIPTION OF THE PREFERRED EMBODIMENTS

Figure 3:
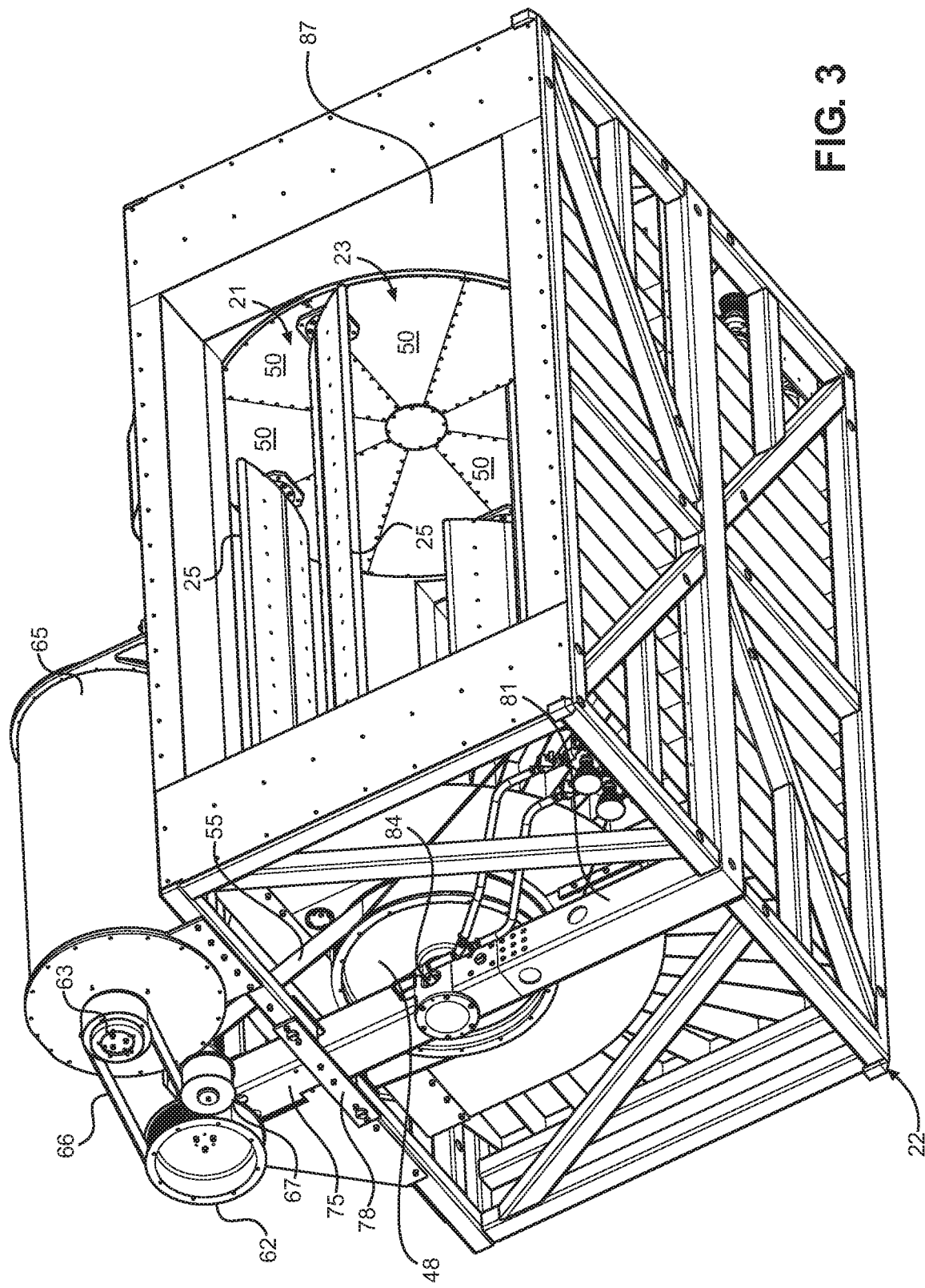
FIG. 3 is a bottom rear perspective view of the first embodiment of FIG. 1 having portions broken away to show a drive belt powered by an output drive gear of an idler shaft powered by rotation of the rotor that drives an electrical generator.
Figure 4:
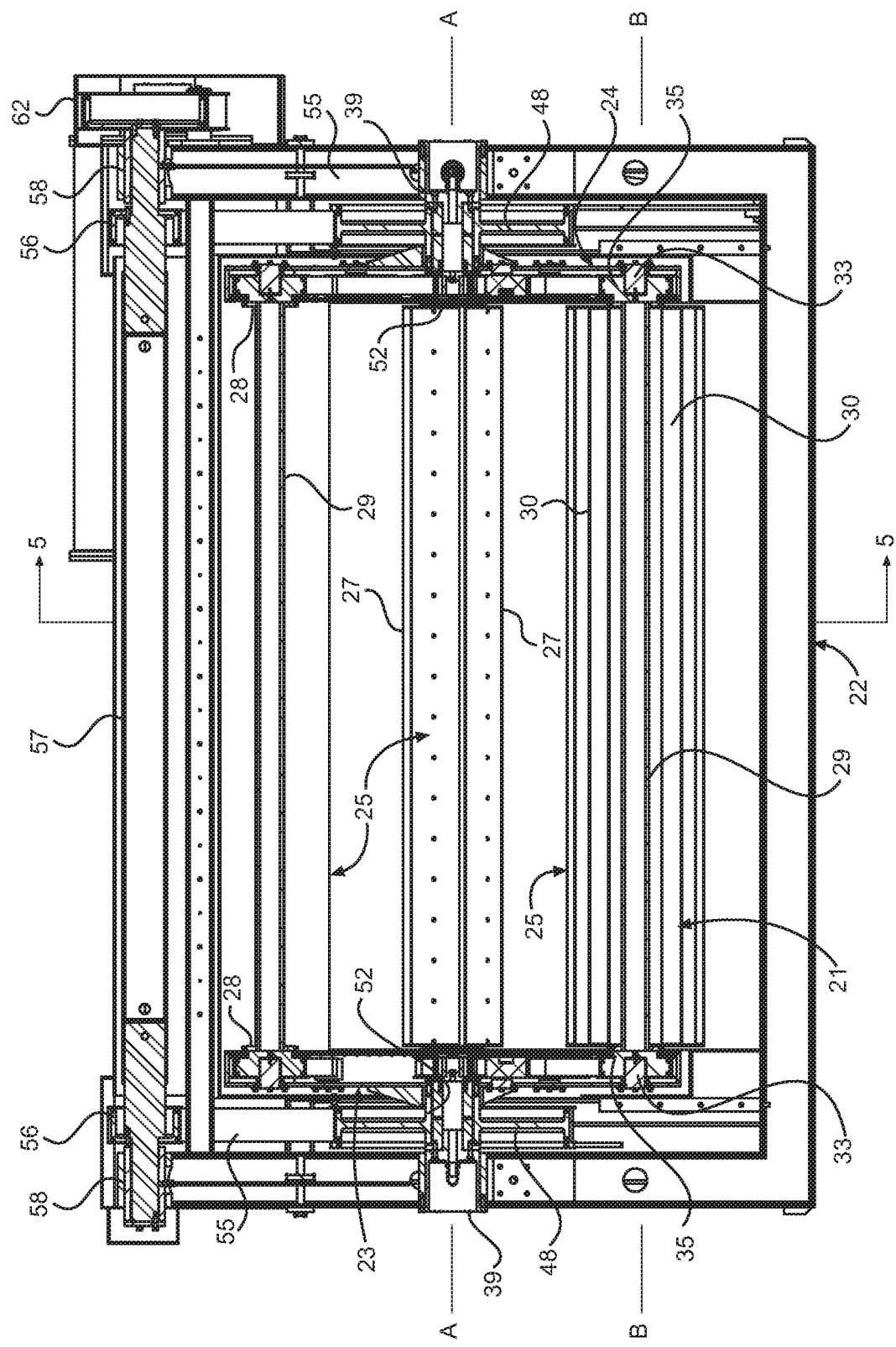
FIG. 4 is a cross section taken across a width, from side to side, of turbine of the first embodiment shown in FIG. 1.

With reference to FIGS. 1-7, the primary components of a first embodiment of turbine assembly 20 of the present invention are a rotor 21 mounted within a frame 22 so that it can rotate about a horizontal axis A-A, see FIG. 4. The rotor has two end plate assemblies 23 and 24 and at least three blades 25 mounted to rotate relative to the end plate assemblies. A configuration of rotor with four or more blades is preferred, with all blades being identical formed, as is shown in the drawing figures. The blades are equally spaced and symmetric about a plane including their chord, as well as the transverse mid plane and a plane normal to both of these. The opposite edges 27 of each blade are also identical in shape and configuration. The blades span across the rotor from one end plate assembly to the other, and rotate about a central axis B-B at a mid-plane of the chord and centered between the opposite edges, see FIG. 4. Each blade has a central tube or shaft 29 aligned with and rotatable about the axis B-B and a pair of reinforcing but shorter outer tubes or shafts 30 that extend parallel to and on opposite sides of the central tube 29, see FIGS. 4 and 5. Each blade has a streamlined outer profile having somewhat curved and oppositely oriented surfaces 31 which taper inwardly from the central tube to the opposite edges such that the thickness of the edges is less than a thickness at the central tube. There is a radial bearing 32 in a bore on each end of the blades that allows the blades to freely spin about short stub axles 33 attached to, and equally spaced, relative to one another to each end plate assembly 23 and 24. The stub axles protrude into each of the end plate assembly and are mounted to the opposite ends of the tubes or shafts 29 of the blades. A washer style thrust bearing 28 is provided at each end of the central tube of each blade, allowing each blade to spin freely without rubbing on the end plate assemblies.

Figure 5:
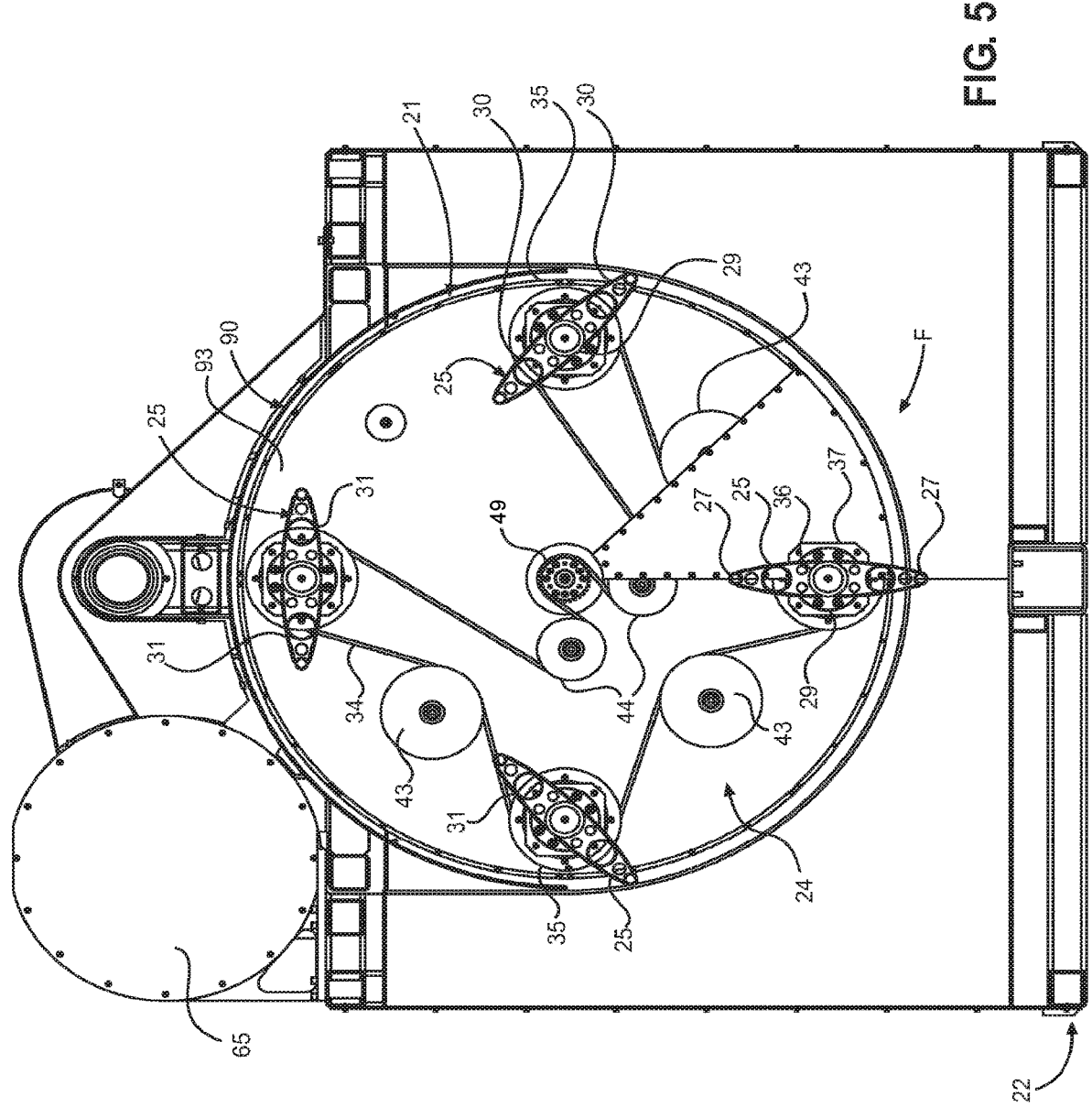
FIG. 5 is a cross section taken along line 5-5 of FIG. 1 having a plurality of cover plates for sealing one of the end wall assemblies of the rotor removed to show a timing belt or chain for rotating timing gear pulleys connected to drive shafts that mount the rotor to the turbine support frame.
Figure 10:
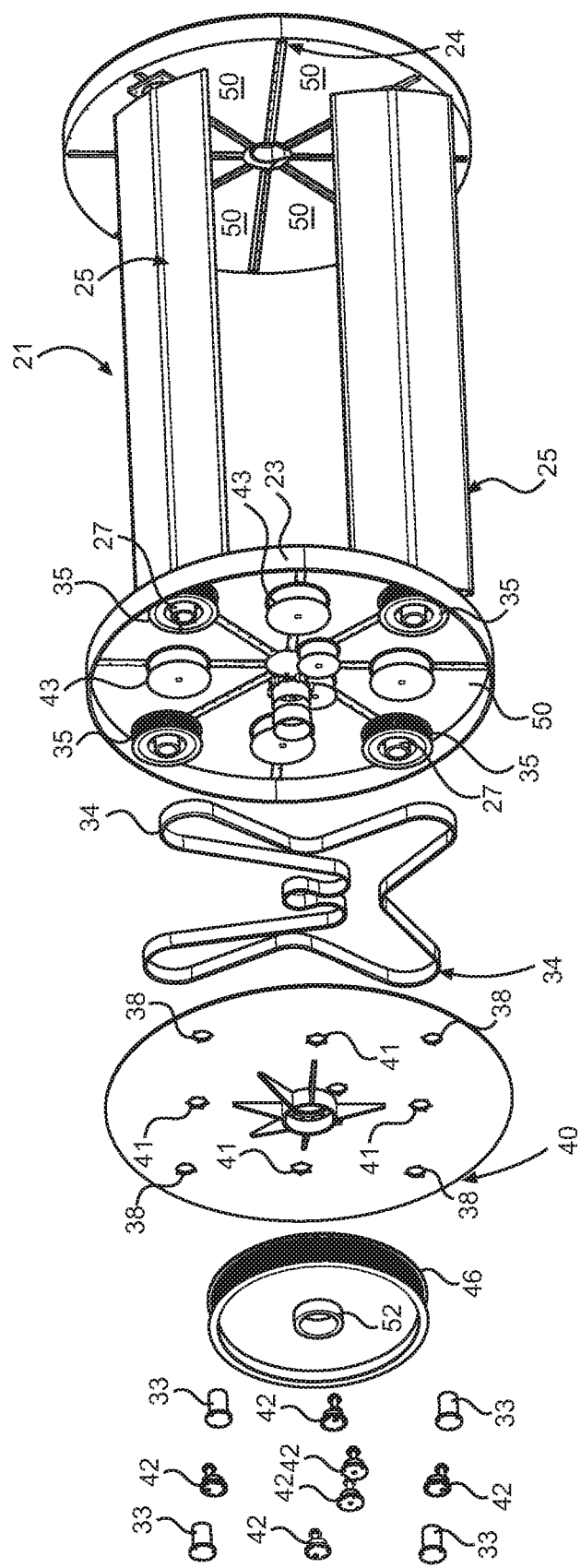
FIG. 10 is a front perspective view of the rotor of the first embodiment having one of the end plate assemblies of the rotor shown as an exploded assembly view.

With reference to FIGS. 5 and 10, the rotation of the blades about the axes B are controlled by a toothed timing belt or chain 34. Timing pulleys 35 are attached to each end of the central tube or shaft 29 of each blade. Inside of each timing pulley, a portion of each blade is sized to fit a lip seal 36 mounted to a square plate 37, see FIG. 5. The square lip seal plates 37 are installed on the blades before the timing pulleys, and are retained in place when the timing pulleys are mounted thereto. Each rotor end plate assembly 23 and 24 includes a large, solid plate 40, see FIG. 10, with holes 38 therein in which the blade stub axles or shafts 33 are mounted, and a central hole through which a central stub axle 39 extends about which the rotor spins, see FIG. 4. Each solid plate 40 also has holes 41 to mount additional stub axles 42 which are used to support idler pulleys 43. The stub axles 42 supporting the idler pulleys are made eccentric and allow adjustment of belt tension. The timing belt 34 is routed around each of the timing pulleys 38 mounted on the ends of the central tube 29 of each blade with a toothed side of the timing belt facing in, engaging teeth provided along each of the timing pulleys, then inside of three larger idler pulleys 43, with the idler pulleys acting on the smooth back side of the timing belt. Between two of the blades, the timing belt is routed around two smaller idler pulleys 44 mounted near the center, but across on the far side of the center from the two blades that they are between.

The timing belt system for each side plate assembly is then routed around the smaller idler pulleys 44 with the back side facing them, and the toothed side wrapping around a central timing pulley 49 mounted to the central stub axle 39 on which the rotor spins. The central timing pulley has a second number of teeth 46 thereon in relation to the other timing pulleys. The belt and pulley system is identical on both sides of the rotor.

Each timing belt system is completely covered by a set of pie-shaped plates 50 which are independently removable, and screwed to each other along radial joints between them. Two pie-shaped plates or segments 50 are required at the opposite ends of each blade. These pie-shaped plates are attached with screws near their outer edge to curved wall parts that themselves are secured near the outer edge of the rotor. A central round plate, not shown, screws or otherwise is secured to the pie-shaped plates and completes the enclosure of each belt system. The lip seals 36 and plates 37 of each blade are screwed to the pie-shaped plates to create a water tight seal around each of the central tube or shaft of each blade. During operation of the turbine, the timing belts 34 connect the blades to the fixed central stub axles 39.

The timing pulleys 35 on the blades have twice the number of teeth as the central timing pulley 49 so that as each blade rotates 180 degrees (half a rotation) for each complete rotation of the rotor 21. The rotational action of the blades is set at an angle to allow the blades to effectively extract energy from a stream of water of any depth flowing through the turbine normal to the axis of rotation A-A of the rotor. As shown in FIG. 5, the blade 25 at the bottom of the rotor is set with its chord normal to fluid flow as shown by the arrow "F", maximizing drag in the flow, and creating useful torque on the rotor, and since each blade rotates half as much as the rotor, when that same blade gets to the top of the rotor (half a rotation of the rotor), its chord will be parallel to the flow, minimizing drag, see the top rotor blade in FIG. 5. At each quarter of a complete rotation of the rotor, each blade proceeds to pitch more into the flow, with the blade chords being 45 degrees to the flow direction when the blades are halfway between the top and bottom of rotation of the rotor, and so on.

Figure 6:
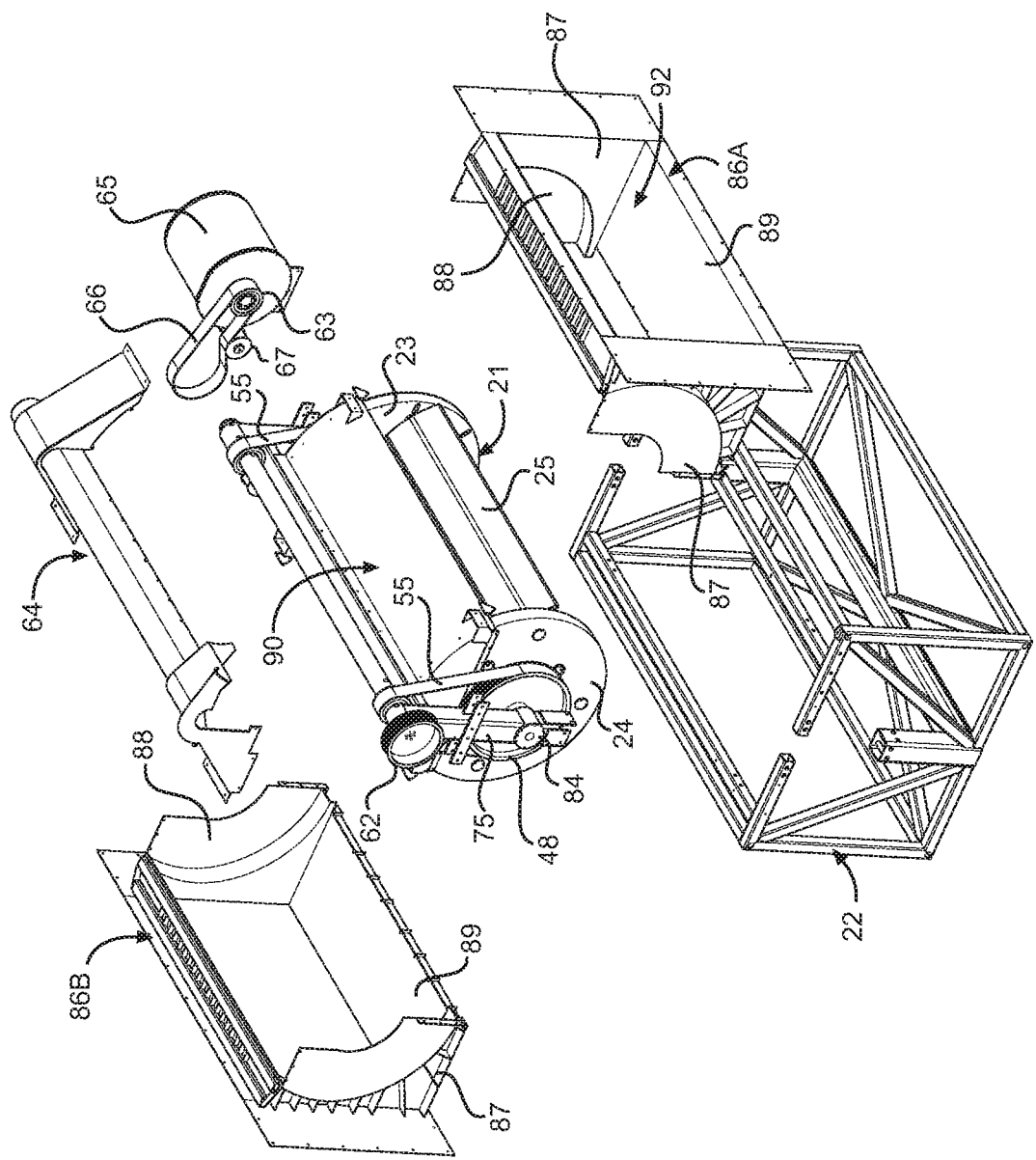
FIG. 6 is a perspective assembly view of the embodiment of invention shown in FIG. 1.

With reference to FIGS. 4, 6, 8, 9 and 10, the main stub axles 39 mounted to the rotor protrude outward through an extended bore 52 of the large timing pulley 48 attached to each turbine side plate assembly. Bearings, not shown, in this bore allow low-friction rotation of the rotor assembly. Large timing belts 55 engage the large timing pulleys 48 on each of the rotor side plate assemblies, and also engage smaller timing pulleys 56 connected to an idler cross-shaft 57 mounted in bearings above the rotor assembly, as shown in FIG. 6. Adjustable tensioning pulleys 60 act on the timing belts 55 to maintain tension between the rotor pulleys 48 and the idler shaft pulleys 56. The idler shaft serves to maintain clocking alignment of the two sides of the turbine rotor assembly, and eliminates the requirement for a central axle between the turbine side plate assemblies that would create a large amount of drag in the water flow through the turbine which reduces turbine efficiency. One end of the idler shaft 57 has a timing pulley 62 attached to it, which drives a smaller driven pulley 63 mounted to an input shaft of an electric generator 65 by way of a toothed drive belt 66, see FIG. 3. This belt also has an adjustable tensioning pulley 67 as shown in FIGS. 3 and 6. The generator is used to supply power for electrically powered devices and equipment. A cover guard 64 is mounted over the idler shaft and pulleys associated therewith.

Figure 7:
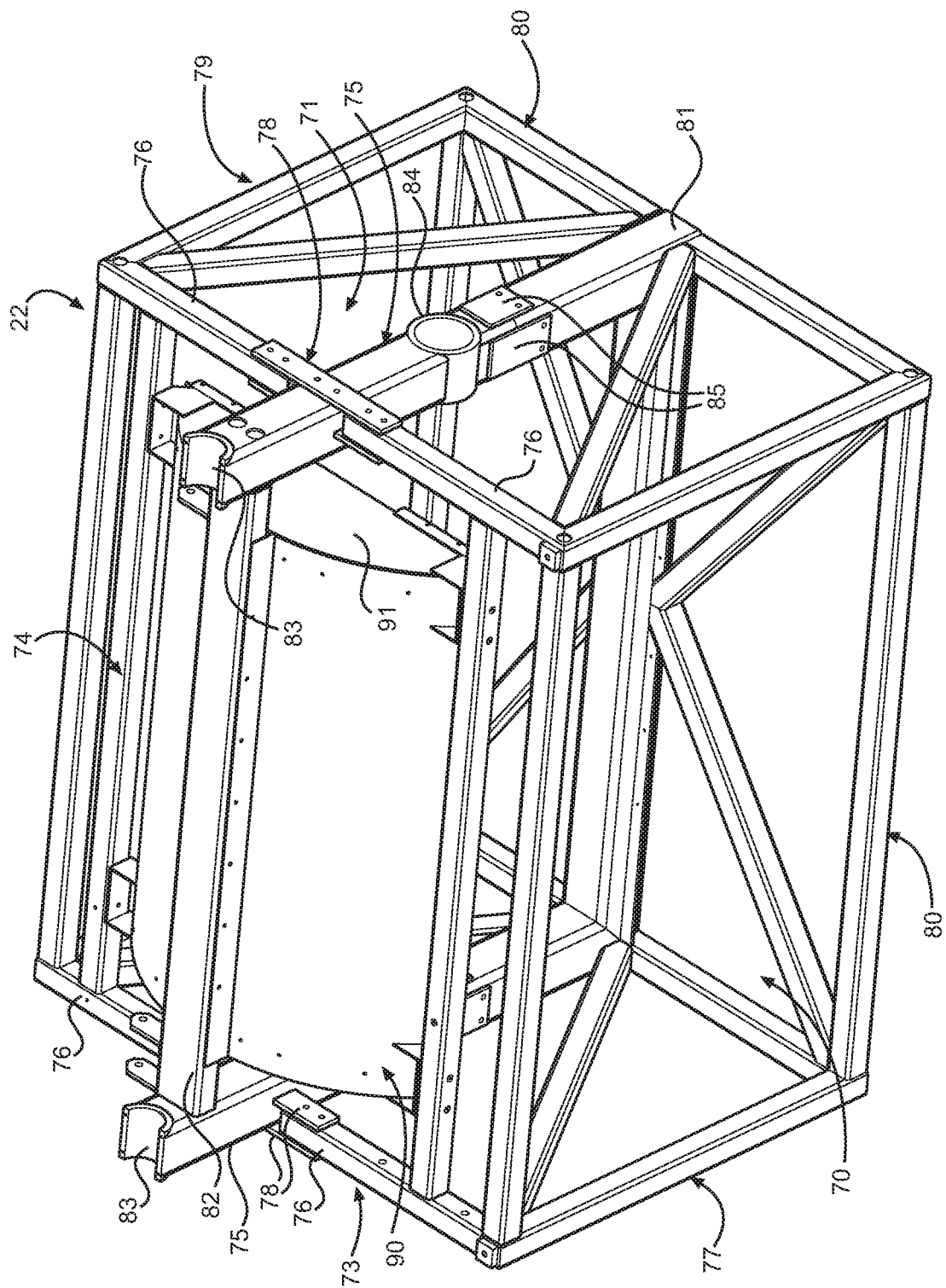
FIG. 7 is a front perspective view of the frame of the turbine assembly shown in FIG. 1.
Figure 8:
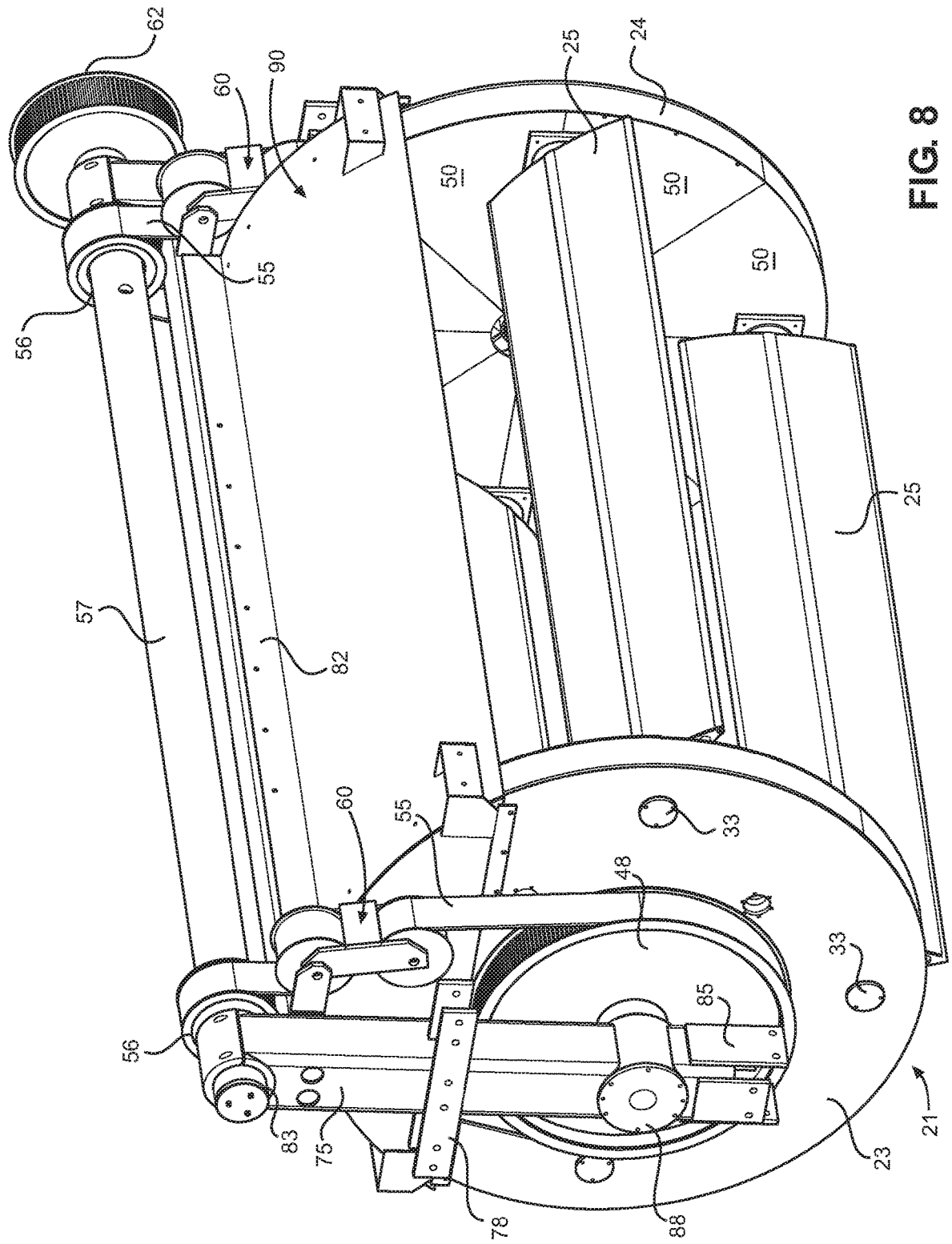
FIG. 8 is a front perspective view of the rotor and idler drive shaft for powering a drive gear for supply power to an electrical generator.
Figure 9:
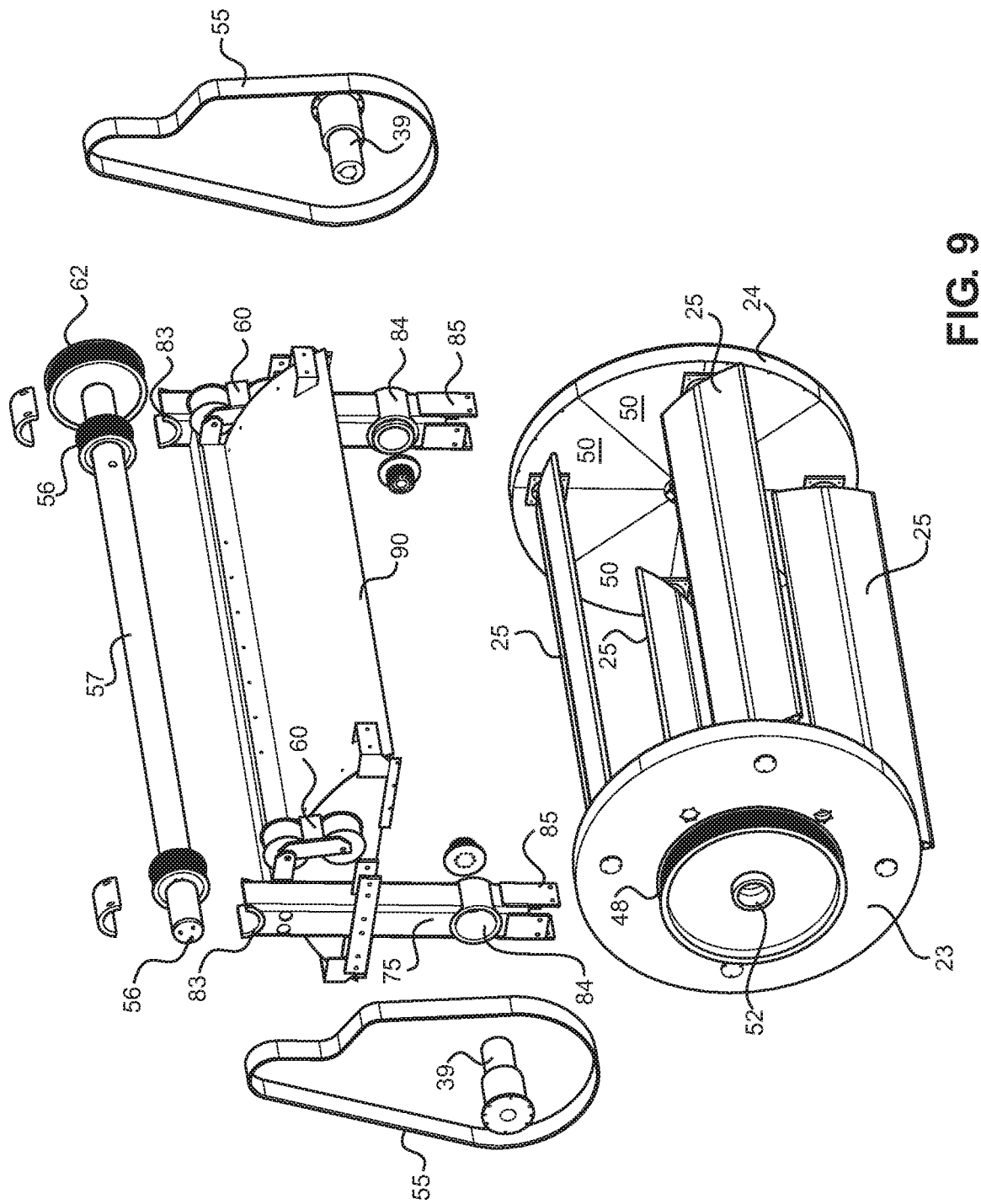
FIG. 9 is a perspective assembly view of the rotor and idler drive shaft shown in FIG. 8.

With reference to FIGS. 6 and 7, the frame 22 in which the rotor is mounted is a welded tubular steel or other metal box-like structure which is open between inlet and discharge or outlet ends 70 and 71, respectively. The top of the frame is divided into two generally horizontally opposing U-shaped portions 73 and 74 which are spaced from one another to provide clearance for a pair generally central upper vertical frame components 75 that are secured to horizontally oriented legs 76 of the U-shaped portions by bolts that secure pairs of attachment plates 78 to the opposing legs. The plates may be removed to separate the upper vertical frame components 75 and the U-shaped top frame portions 73 and 74 from the remaining portions of the frame 22. Several reinforcing steel or other metal tubes 72 are connected to the horizontally oriented legs 76 of the U-shaped portions of the spaced top frame components 73 and 74. The frame 22 also includes braced side frame components 77 and 79 and a pair of reinforced bottom framework portions 80 that are welded to a pair of lower vertical frame components 81.

With continued reference to FIGS. 6 and 7, the pair of removable upper vertical frame components 75 are connected by a cross beam 82 and include upper bearings 83 for the idler shaft 57. The upper vertical frame components also include a bearing sleeve 84 in which the stub shafts 39 which support the rotor within the frame are mounted. Mounting brackets 85 extend below the bearing sleeves 84 and are removably secured to the upper portion of the lower vertical frame component 81 such as by bolts. The upper vertical frame components 75 are thus removably attached to the legs 76 of the U-shaped frame portions 73 and 74 and the lower vertical frame component. The rotor may be easily removed from the frame for maintenance when the upper vertical component is disconnected from the lower vertical component 81 as shown in FIG. 6.

Figure 11:
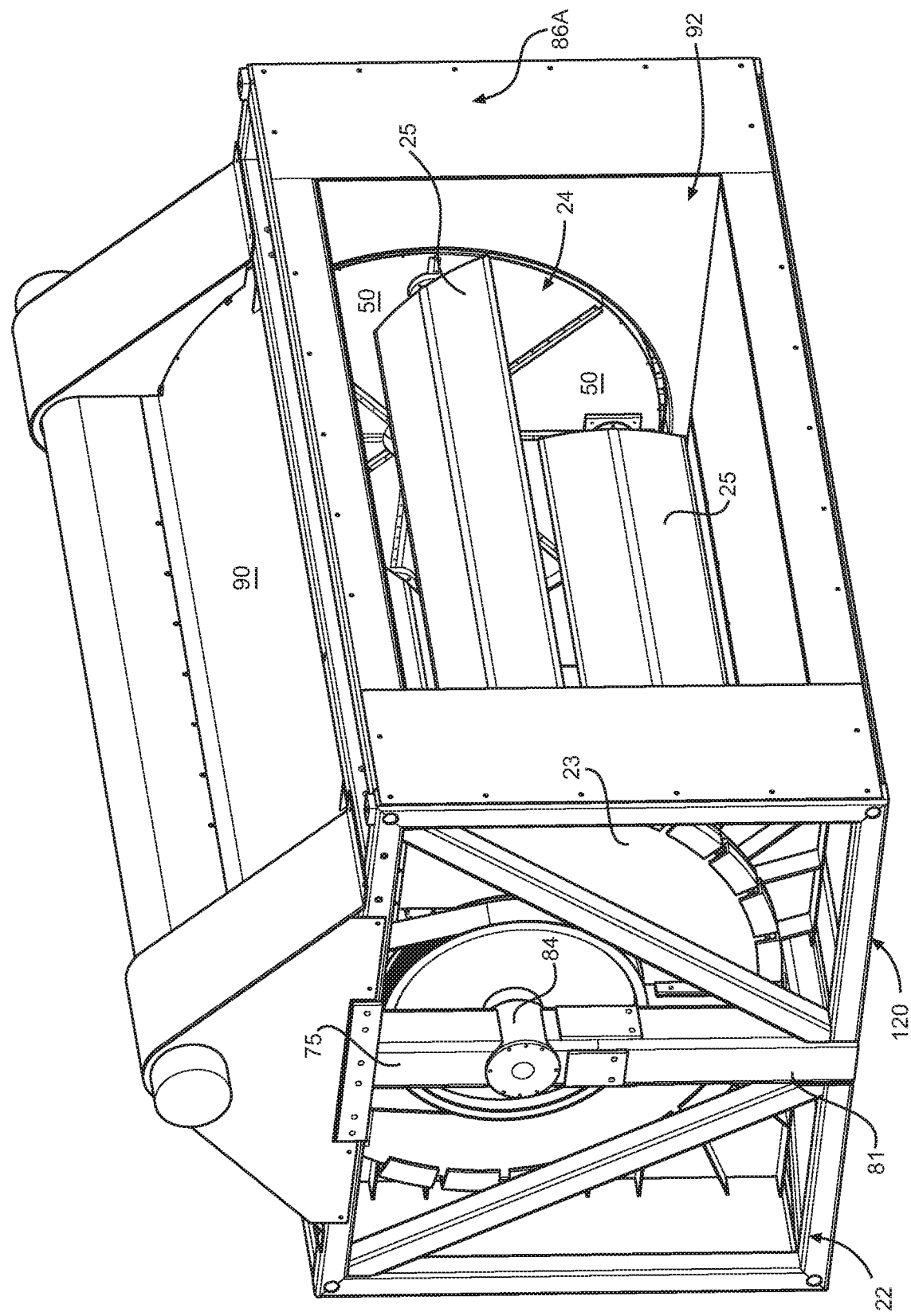
FIG. 11 front perspective view of a second embodiment of turbine assembly using permanent magnets mounted to the two rotor end plate assemblies that cooperate with a stator coil segments mounted to the surrounding rotor housing.
Figure 12:
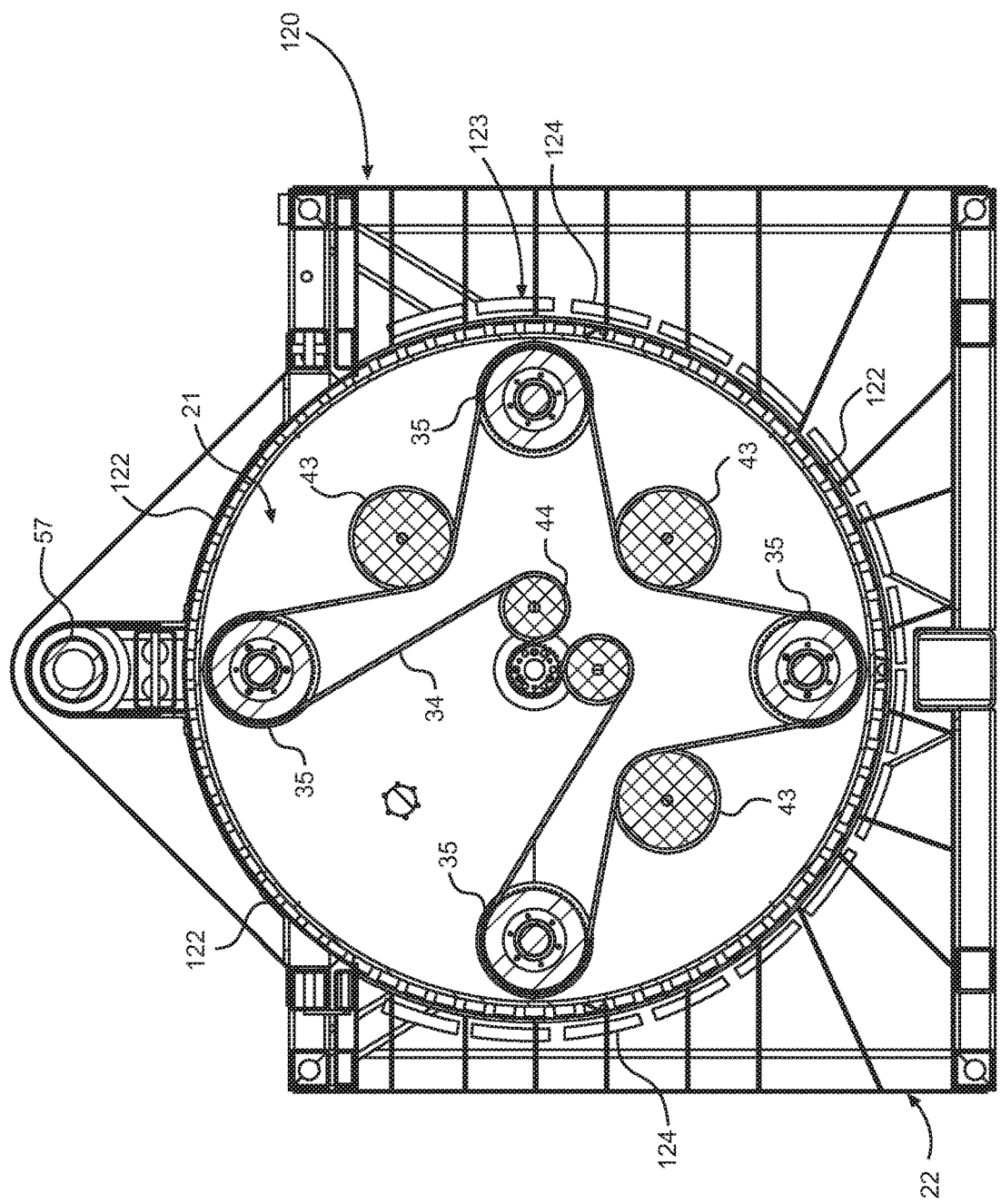
FIG. 12 is a side perspective view of the rotor and surrounding housing of FIG. 11 showing the permanent magnets mounted to one of the rotor end plate assemblies and their relationship to stator coil sections or segments and having portions broken away to show a timing belt for rotating the turbine blades and that is driven by one of the stub shafts driven by the rotor.

As shown in FIGS. 6 and 11, a flow directing inlet liner 86A of steel or other metal construction is inserted with and secured to the open front end 70 of the frame and a flow directing discharge liner 86B of welded steel or other metal construction is mounted in the rear open end 71 of the frame so as to be parallel to the water flow direction relative to the rotor. The liners are sealed to the frame and to one another to prevent water leakage when the turbine is in use. The liners include arcuate opposite side walls 87 which are recessed at 88 to provide seats for the opposite end plate assemblies 23 and 24 of the rotor. The liners also included planar lower walls 89 that are sealed to one another when mounted within the frame. The liners thus direct water straight through the turbine rotor without allowing water to move out of the sides or bottom of the frame 22 to thereby reduce water losses within the turbine.

Figure 1:
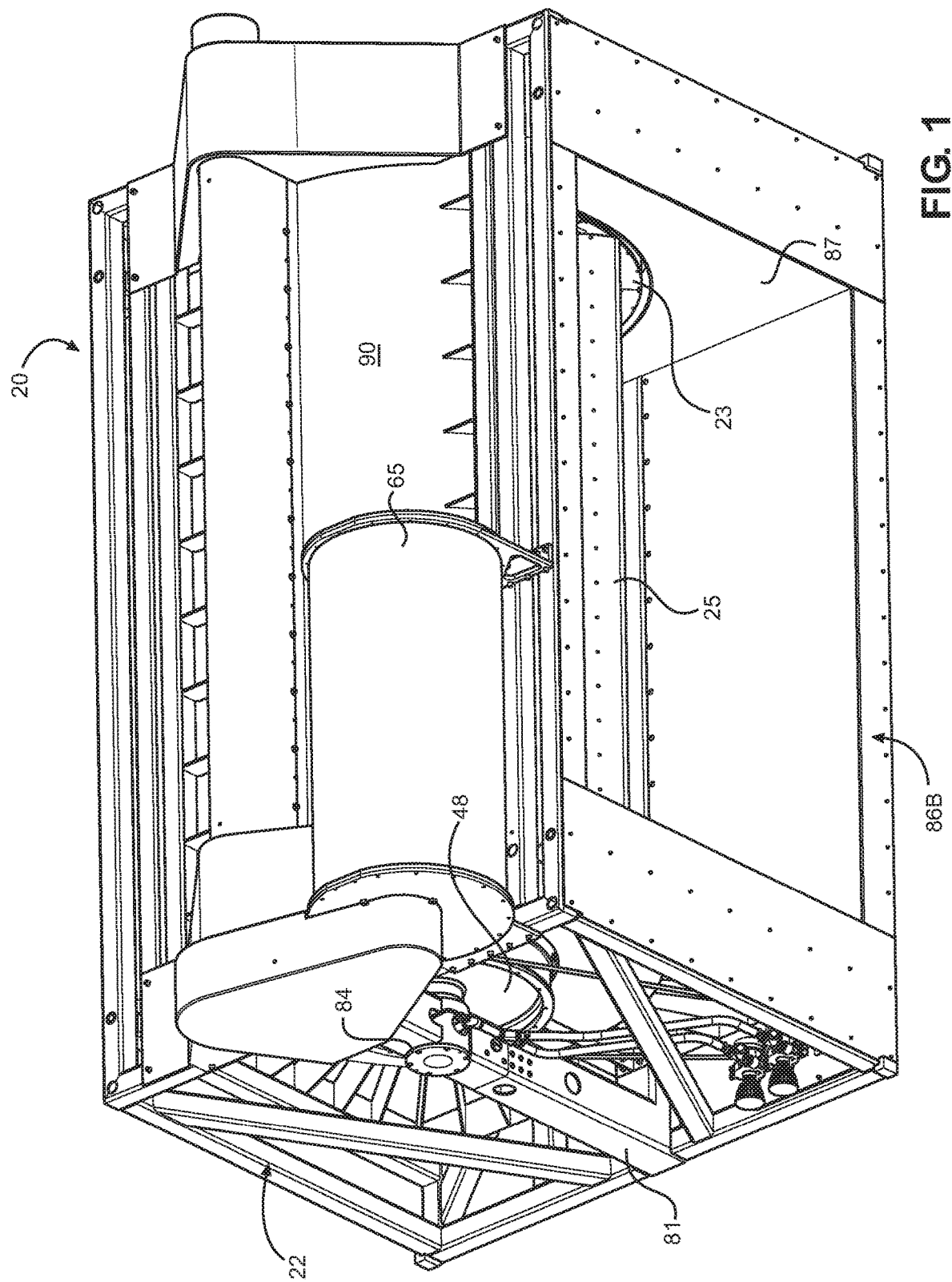
FIG. 1 is rear perspective view of a first embodiment of turbine assembly showing a rotor mounted within a frame and showing a discharge fluid flow outlet from the rotor chamber.
Figure 2:
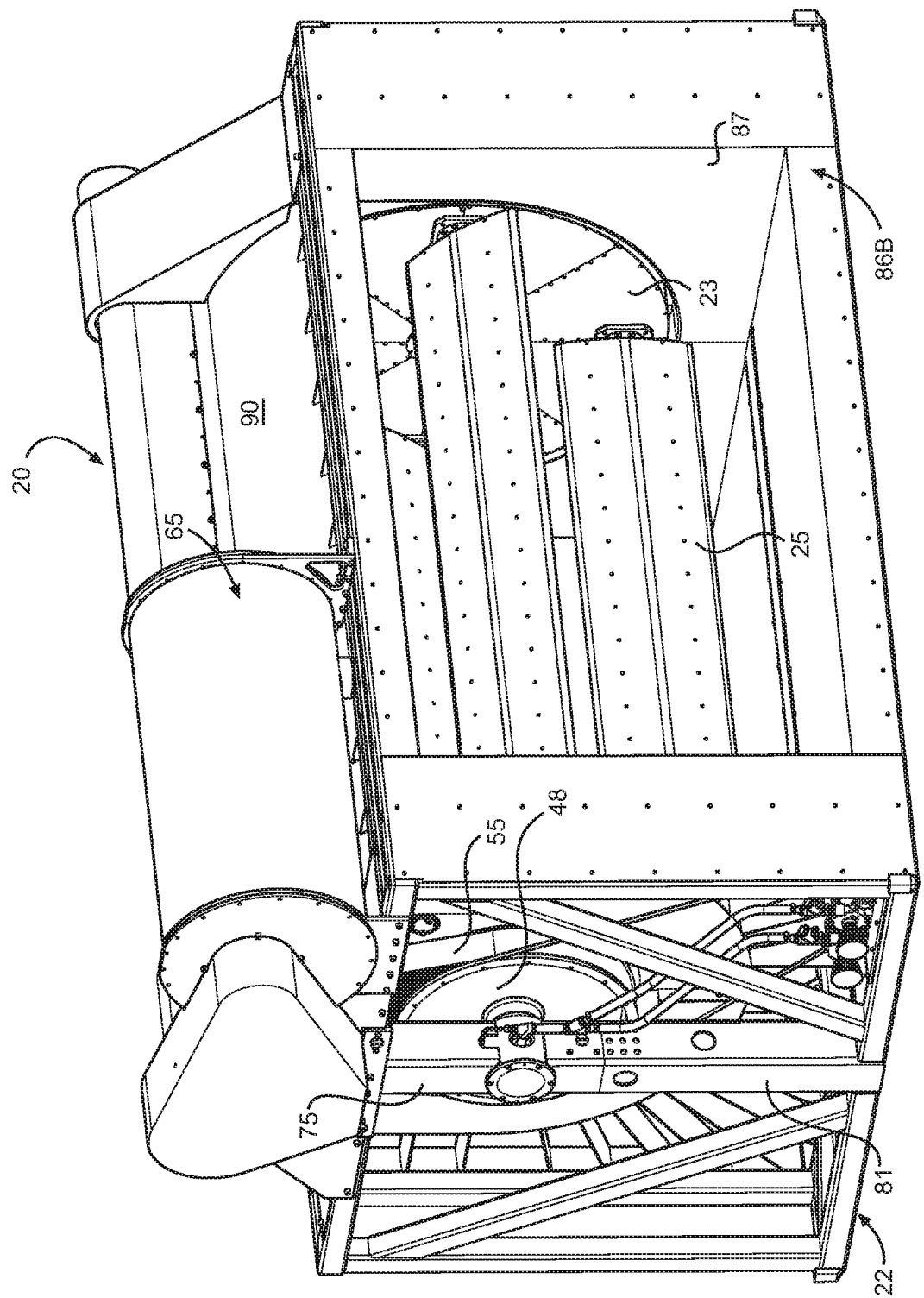
FIG. 2 is a view similar to FIG. 1 but showing more of the rotor blades.

The inlet liner 86A defines an inlet opening 92 which is lower than the top blade of the rotor assembly when the rotor assembly is mounted with the frame 22, see FIGS. 6 and 1. The upper edge of the opening 89 is generally aligned with a bottom edge of an inverted basin or arcuate hood 90, also made of steel or other metal, that covers an area above the rotor, as is shown in FIG. 11. The hood includes opposite side walls 91 and is sealed to the other liner components so as to create an air pocket 93, see FIG. 5, in the upper portion of the rotor housing, even as the water level rises above the height of the turbine rotor. This air pocket allows the blades of the rotor to emerge above the water and proceed through an air environment as opposed to a conventional water environment. In conventional turbines the upper blades must pass through water which causes the highest drag on the blades and thus the rotor. Where the turbines of the present invention will be mounted in permanently deep water, a small air pump (not shown) can be attached to the turbine rotor hood to pressurize air from above the surface of the water and pump the air into the hood or basin 90 to create the air pocket and replacing air lost to splashing out over time and thus maintaining the air space.

The enclosed belt areas within each rotor side plate assembly 23 and 24 must be maintained full of water during turbine operation to minimize drag, as the water inside these enclosed areas will move along with the rotation of the turbine in this case, instead of running down with gravity and creating drag as would happen if these chambers were allowed to only partially fill with water. A small water pump driven from the rotor (not shown) will serve to fill these areas and also maintain water in each of the main rotor bearings and the bearings at the ends of each blade. The water in each of these bearings will lubricate and cool the bearings during turbine operation.

In an alternate embodiment of turbine, instead of a conventional generator unit driven by belts from an idler shaft of a turbine, a direct-drive multi-pole generator assembly 120 can be integrated into the design of the turbine as shown in FIGS. 11-15. This has the advantage of eliminating most of the load in the main belt system, as the generator must be mounted on both sides of the of the rotor assembly. This allows a much smaller belt to be used on each side from the turbine end plates to the idler shaft, as only unbalances in blade loading from one side to the other will now create loads in the idler shaft and belt system. Larger power capacities can be achieved using this design, as the belt is no longer a limit on the amount of power generated. In this embodiment, the rotor 21, the frame 22, the end plate assemblies 23 and 24, the blades 25, the timing belts 55 and related pulleys on each of the rotor, and the idler cross-shaft 57 mounted in bearings 58 above the rotor assembly are the same as the first embodiment. As with the first embodiment, the idler shaft serves to maintain clocking alignment of the two sides of the turbine rotor assembly and eliminates the requirement for a central axle between the turbine side plate assemblies that would create a large amount of drag in the water flow through the turbine which reduces turbine efficiency.

Figure 13:
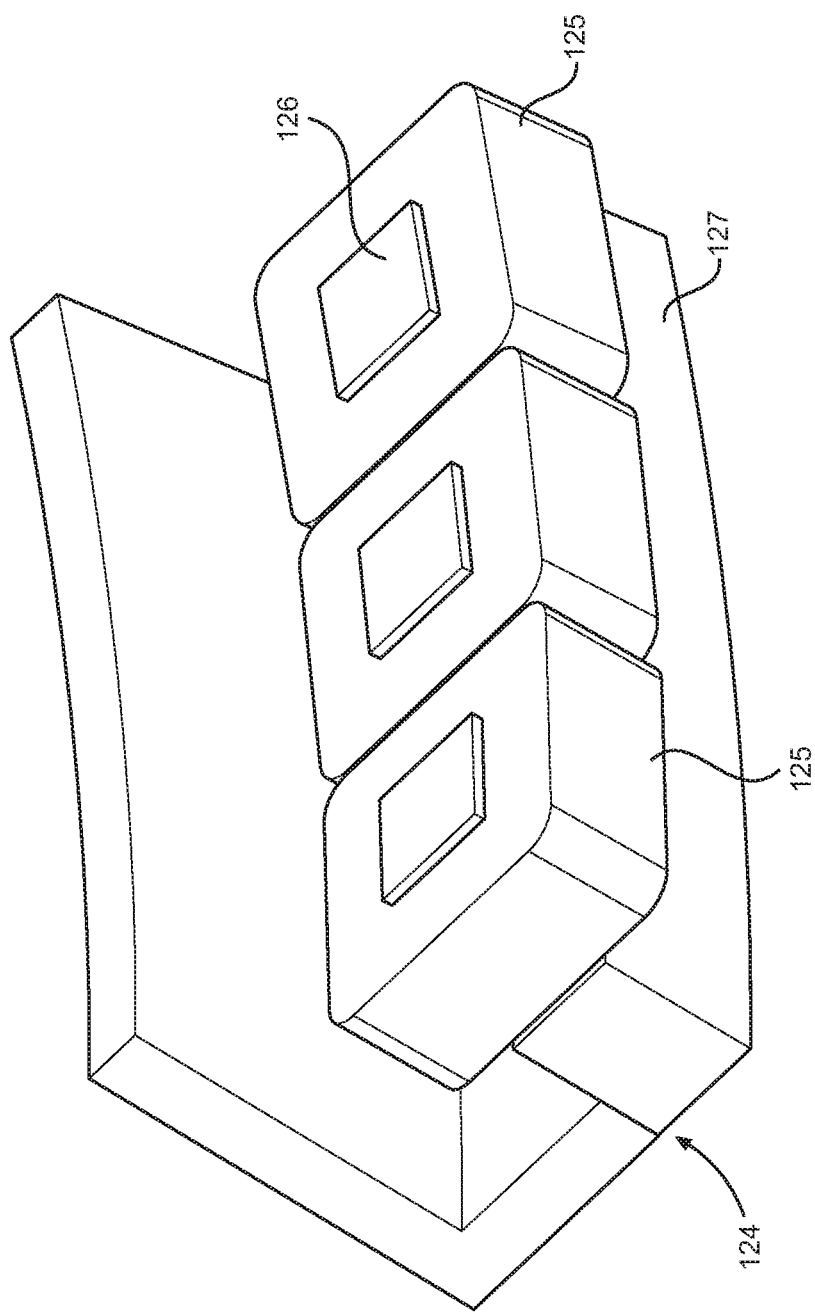
FIG. 13 is an enlarged perspective view of one section of the stator assembly having three coil windings of the turbine assembly of FIG. 11.
Figure 14:
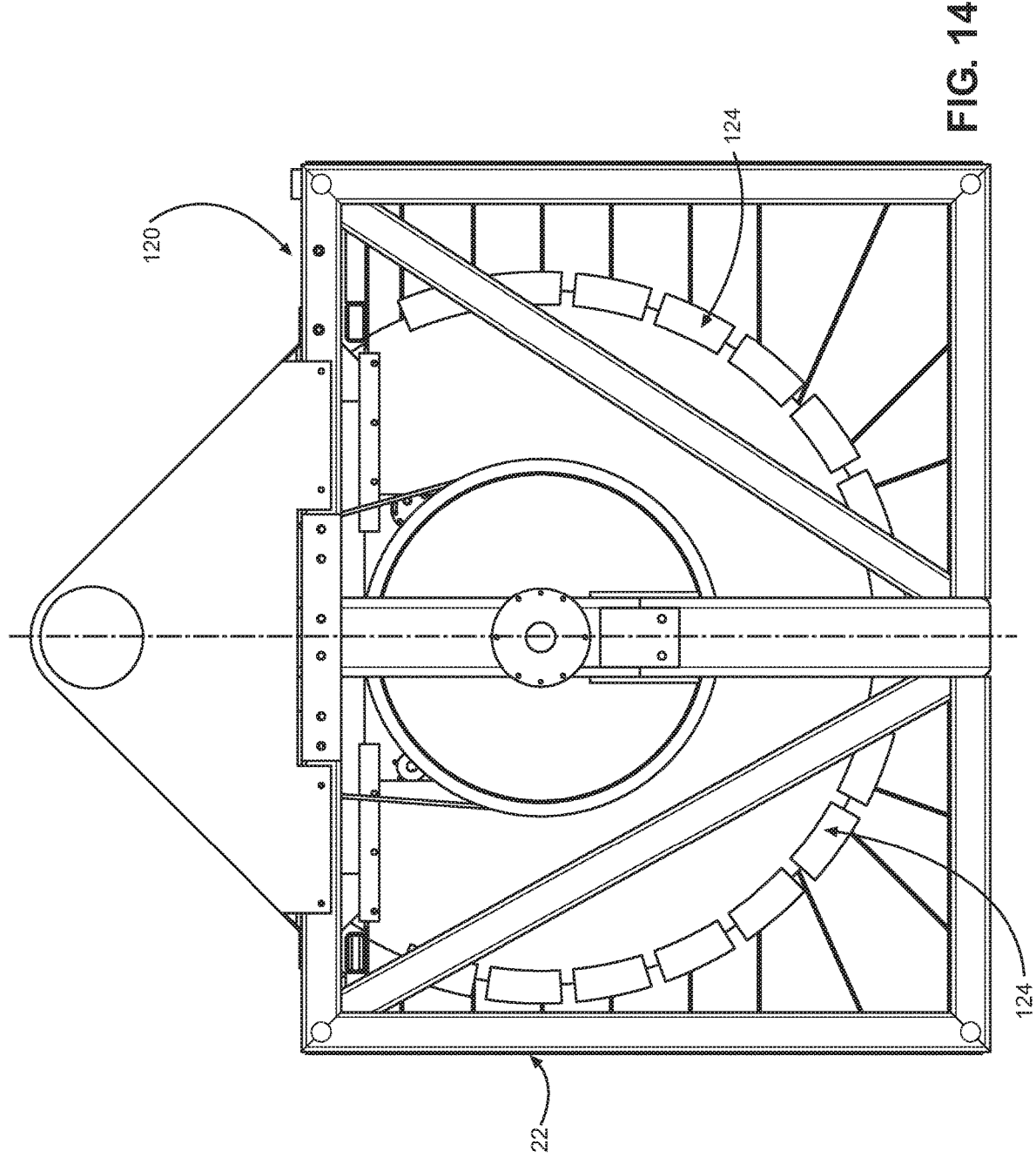
FIG. 14 is a right side view showing a U-shaped stator assembly of FIG. 11.
Figure 15:
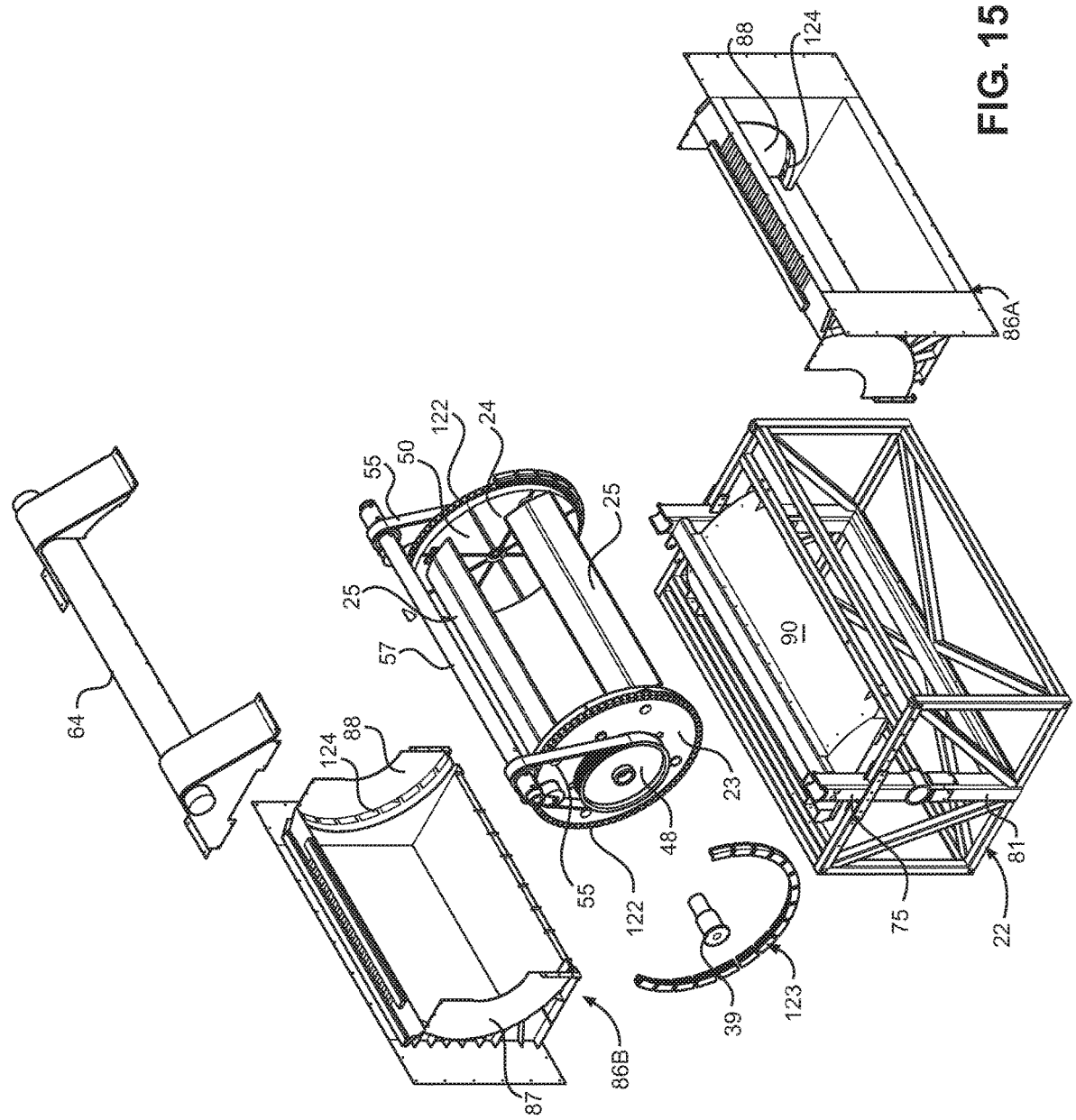
FIG. 15 is an exploded view showing the major components FIG. 11 showing where the stator assembly will be seated on both sides of the inlet and discharge housings of the turbine assembly of FIG. 11.

In this second embodiment, a large number of generally equally spaced permanent magnets 122 are attached to an outer peripheral edge of each of the turbine end plate assemblies. A stator assembly 123 is formed from a large number of electro-magnetic coil segments 124 have three coils of wound magnet wire sealed in water proof windings 125 cast over toothed poles 126 of a laminated soft iron core 127. The stator segments are mounted to the flow directing liners 86A and 86B just outside of the magnets and along the recessed portions 88 of the arcuate opposite side walls 87 of the opposite end plate assemblies 23 and 24. One of the stator segments 124 is shown in FIG. 13. The stator segments are shown in the drawings as being mounted to the inlet and discharge liners 86A and 86B in a "U" shaped array, see FIGS. 14 and 15, however, the segments can be added in a circular manner around flow guide assemblies or liners. The partial stator installation shown in the drawings allows a sealed integrity of the inverted basin or hood 90 to be maintained over the rotor by not requiring penetrations to that structure. This allows the air pocket to be maintained under the hood as previously described. Each group of three coils 125 on the iron cores has the corresponding poles wired together so that three wires output the power generated as the permanent magnets pass over each coil. A switching type controller, not shown, is used to rectify these electrical pulses and synchronizes and ties the power generated to an available power grid, not shown, to which the generator 120 is electrically connected.

Figure 25:
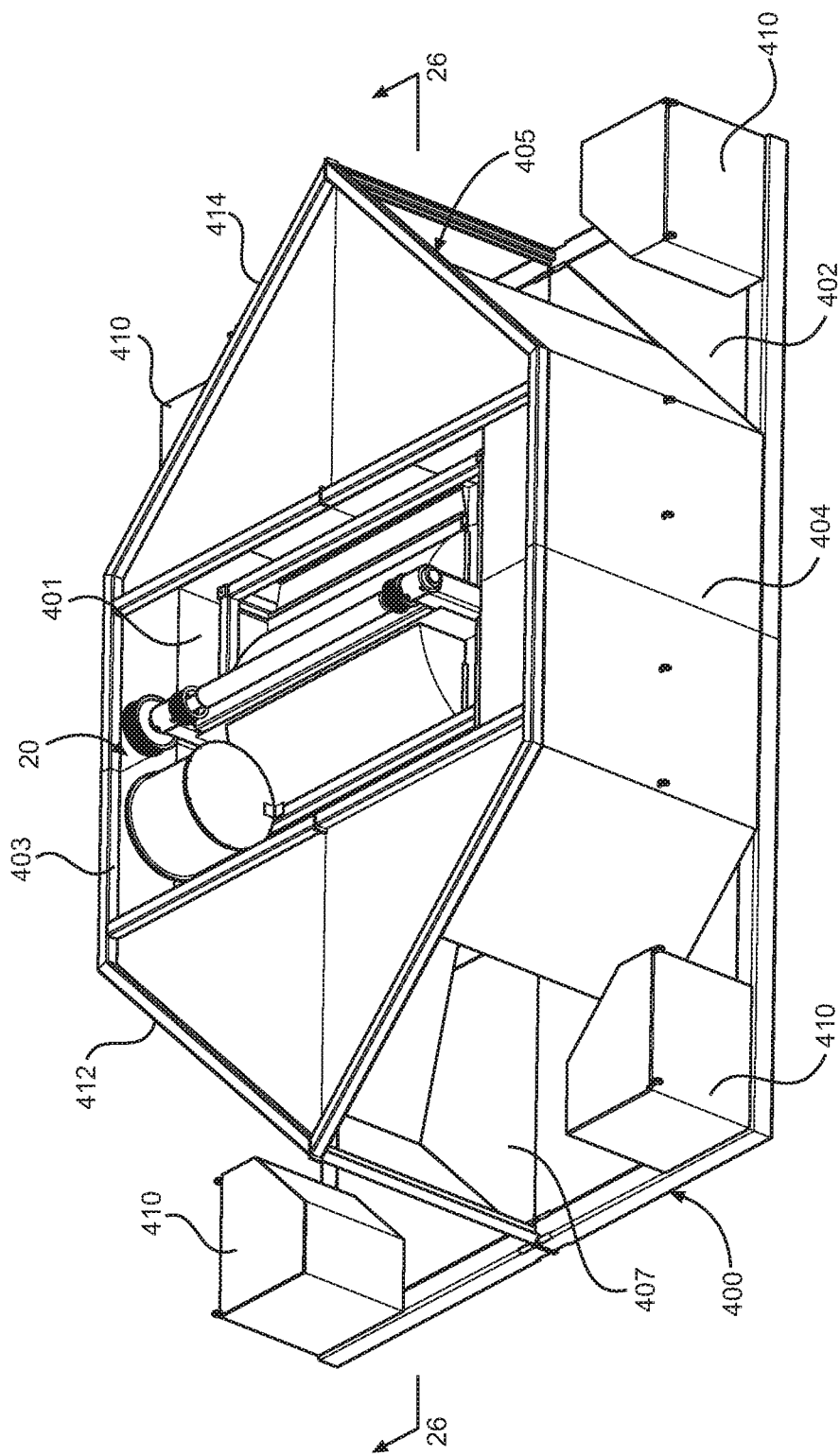
FIG. 25 is a top perspective view of another housing structure for retaining one of the turbine assemblies of the present invention wherein the housing structure includes a weighted base portion and tapered inlet and outlet passageways for directing water flows into and from the rotor of the turbine assembly, assembly includes belts for generator and pulley not shown.
Figure 26:
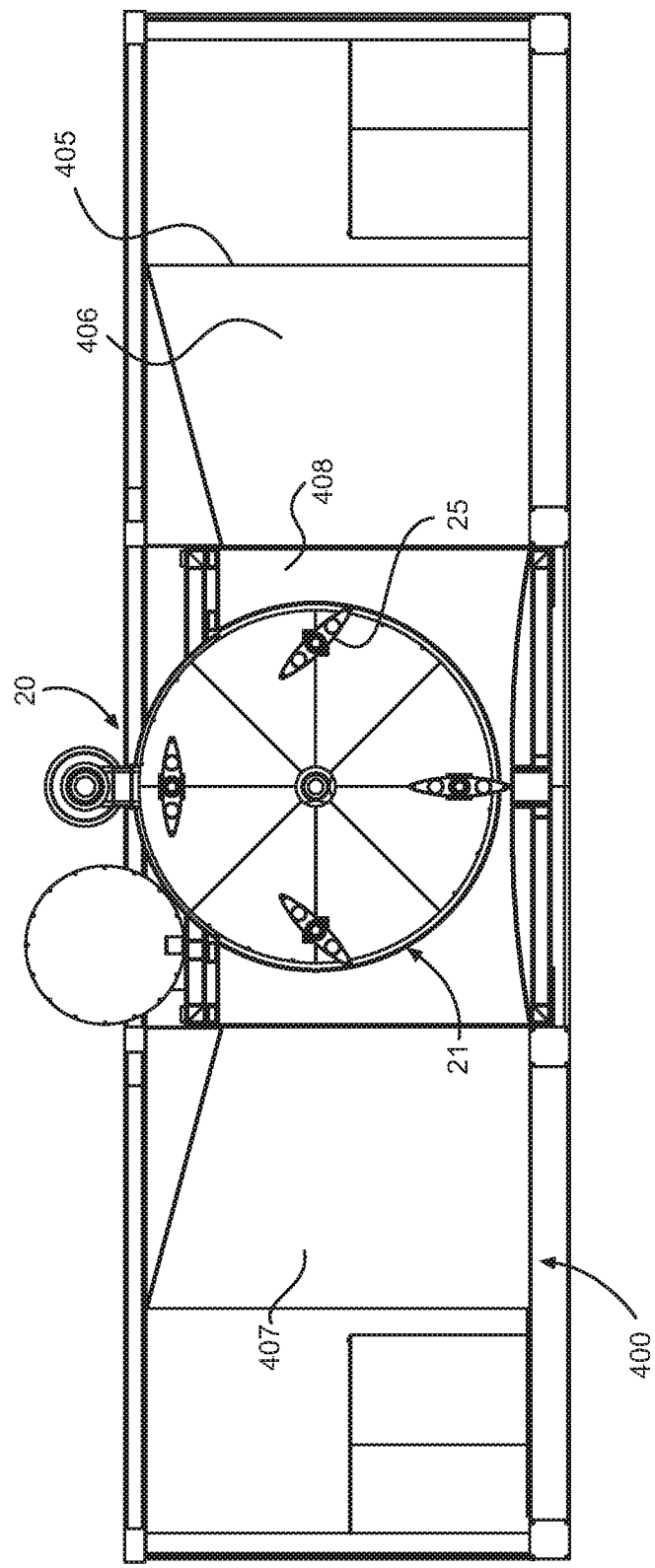
FIG. 26 is a cross sectional view taken along lines 26-26 of FIG. 25

The turbine assemblies of both embodiments are designed to be operative in areas having low head pressure sources as low as approximately one meter and are constructed to be used with a variety of bases or flow control configurations or supporting structures. In many embodiments, the turbine assemblies may be used as replaceable modular units, see FIGS. 16-26. This allows the turbines to be used in many types of natural and man-made water flow channels, including water treatment plant outflows, irrigation canals, natural rivers and streams, culverts, and areas with rapid tidal flows either mounted to the sea bed or as part of a floating barge anchored in a body of moving water. In each of these installations, the frame for the turbine fits into a vertical channel or opening formed in the supporting structure, and it is lowered into place. This makes the entire turbine assembly 20 or 120 easy to remove for repairs or maintenance, and/or immediately replaced with a different, functional unit to minimize power generation outages. An example of a turbine assembly mounted within a flow channel housing 150 for use in shallow rivers and streams is shown in FIGS. 16-18, an example of a turbine assembly mounted to a barge or other floating structure 200 is shown in FIGS. 19 and 20, a turbine assembly mounted in a weir 300 in an irrigation canal or the like is shown in FIGS. 21-24, and a turbine assembly mounted in a cast concrete venturi base structure 400 for tidal or large river applications is shown in FIGS. 25 and 26.

Figure 16:
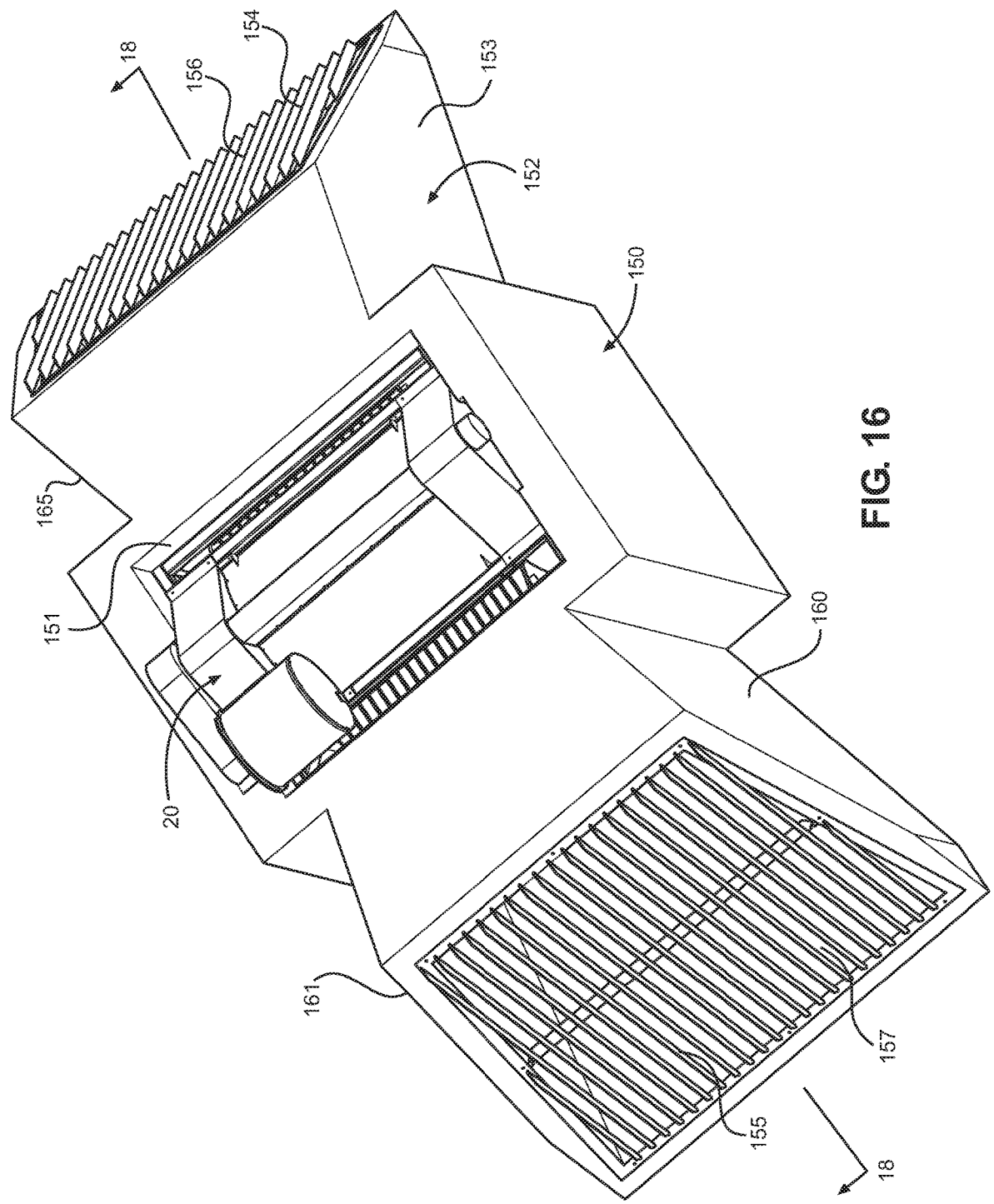
FIG. 16 is a top perspective view of a housing having inlet and outlet flow channels portions and which defines an open top chamber in which one of the embodiments of the turbine assemblies of the invention is selectively mounted.
Figure 17:
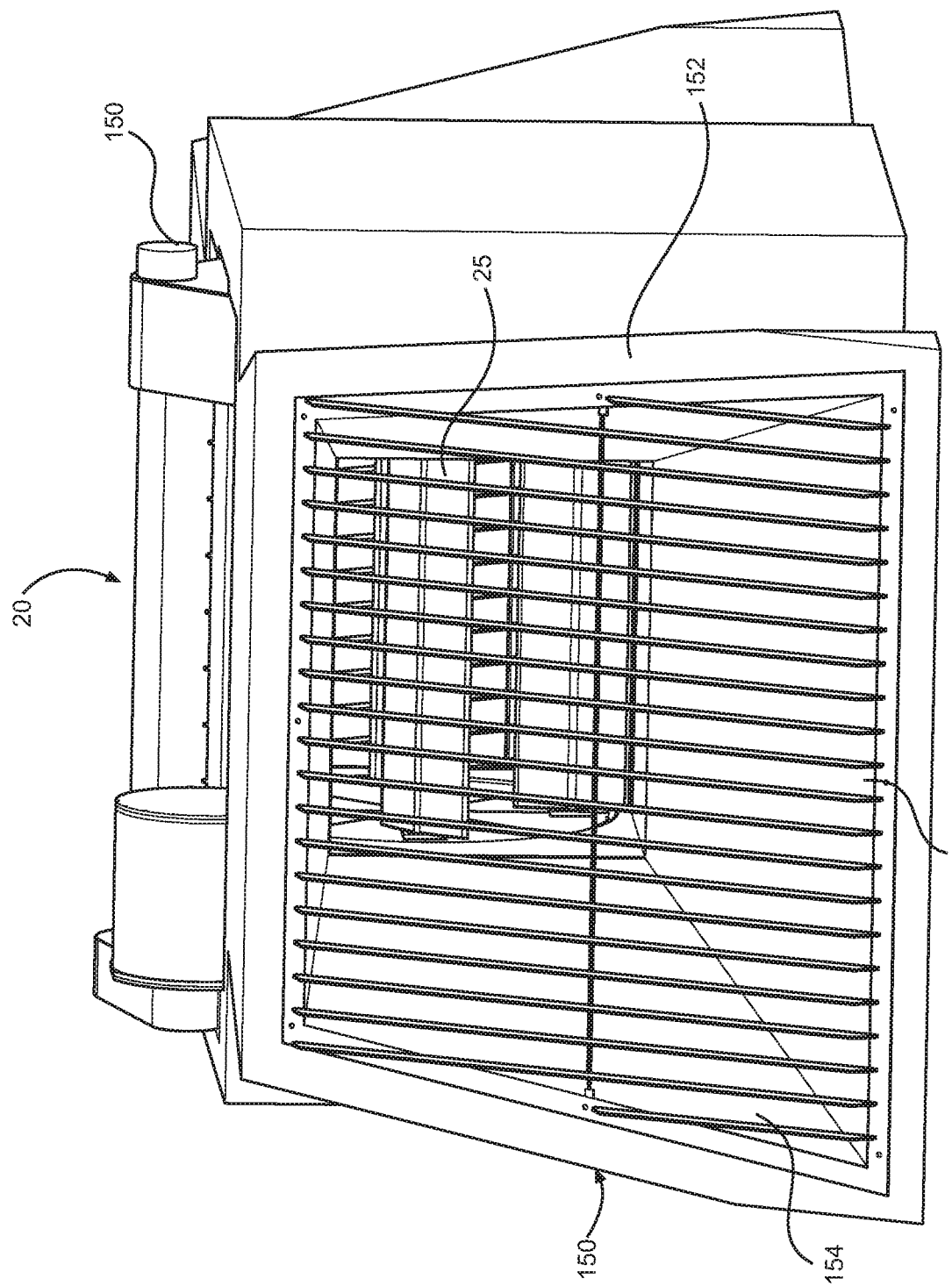
FIG. 17 is a front perspective view of the housing and turbine assembly of FIG. 16.
Figure 18:
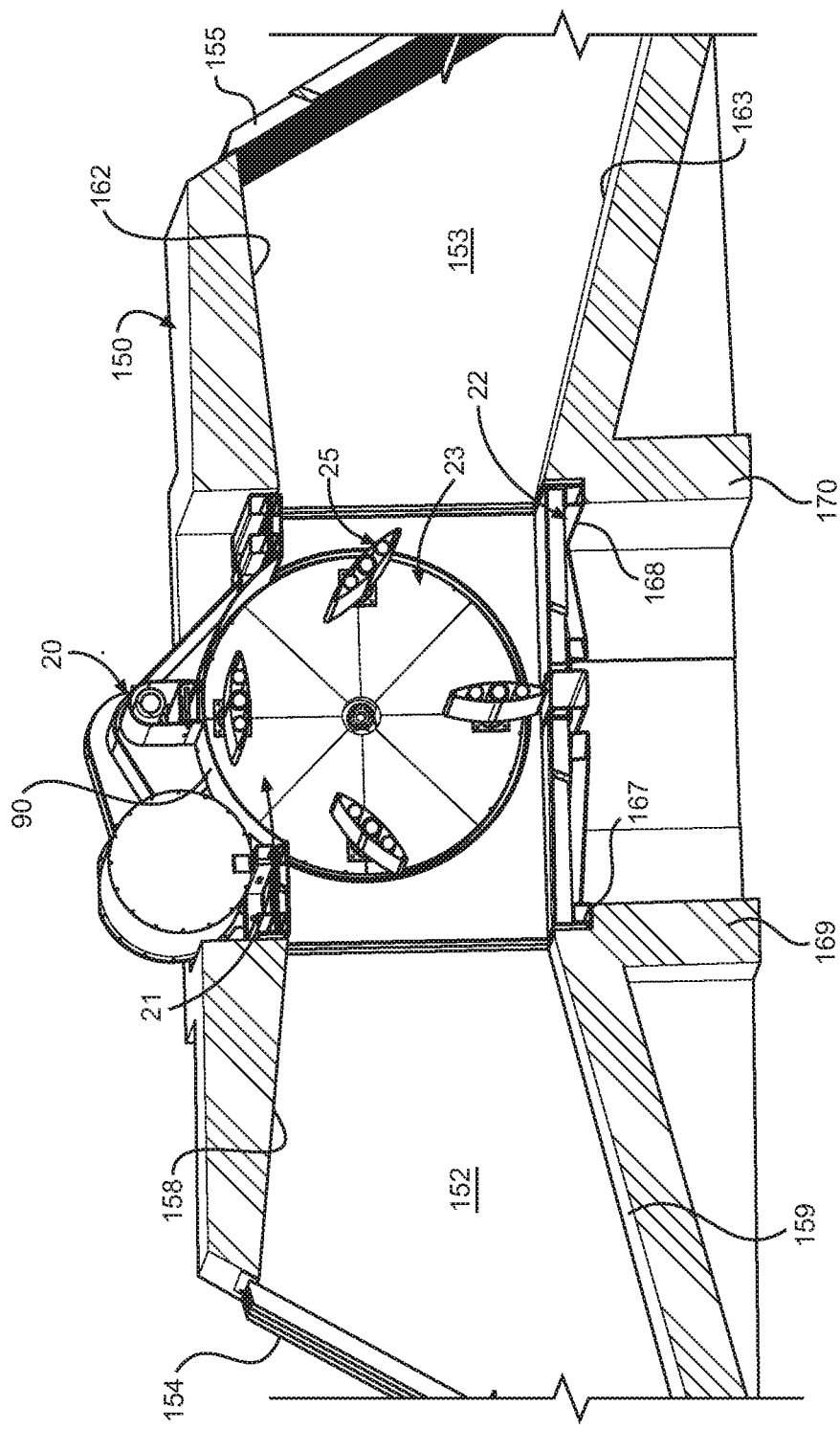
FIG. 18 is a cross section taken along line 18-18 of FIG. 16.

With reference to FIGS. 16-18, a turbine assembly 20, such as shown in FIGS. 1-7, is mounted within an open top chamber 151 of a flow channel housing 150 in such a manner that the housing may be easily lowered for use within the housing or raised from the housing for repair or replacement. The chamber 151 is configured to cooperatively receive the turbine assembly without the requirement of additional fasteners or securing devices. The housing includes an open inlet duct 152 and discharge duct 153 which are oriented upstream and downstream of the turbine assembly, respectively. Grates 154 and 155 are mounted to open inlet and outlet ends 156 and 157 of the inlet and discharge ducts to prevent animals, trash and other objects from entering into the rotor of the turbine assembly when in use. As shown, upper and lower walls 158 and 159 and opposite side walls 160 and 161 of the inlet duct 152 tapper inwardly toward one another along a length of the inlet duct so as to form a venturi channel to accelerated the rate of flow of water entering into the rotor chamber of the turbine assembly. The upper and lower walls 162 and 163 and opposite side walls 164 and 165 of the discharge duct 153 taper outwardly relative to one another along the downstream flow path of water from the rotor chamber.

As shown in FIG. 18, the bottom of the support frame of the turbine assembly rests on support ledges 167 and 168 defined by vertical supports 169 and 170 for the tapered lower walls of the flow channel housing 150. The housing may be fabricated from metal, light weight concrete or other composite materials and the like.

Figure 19:
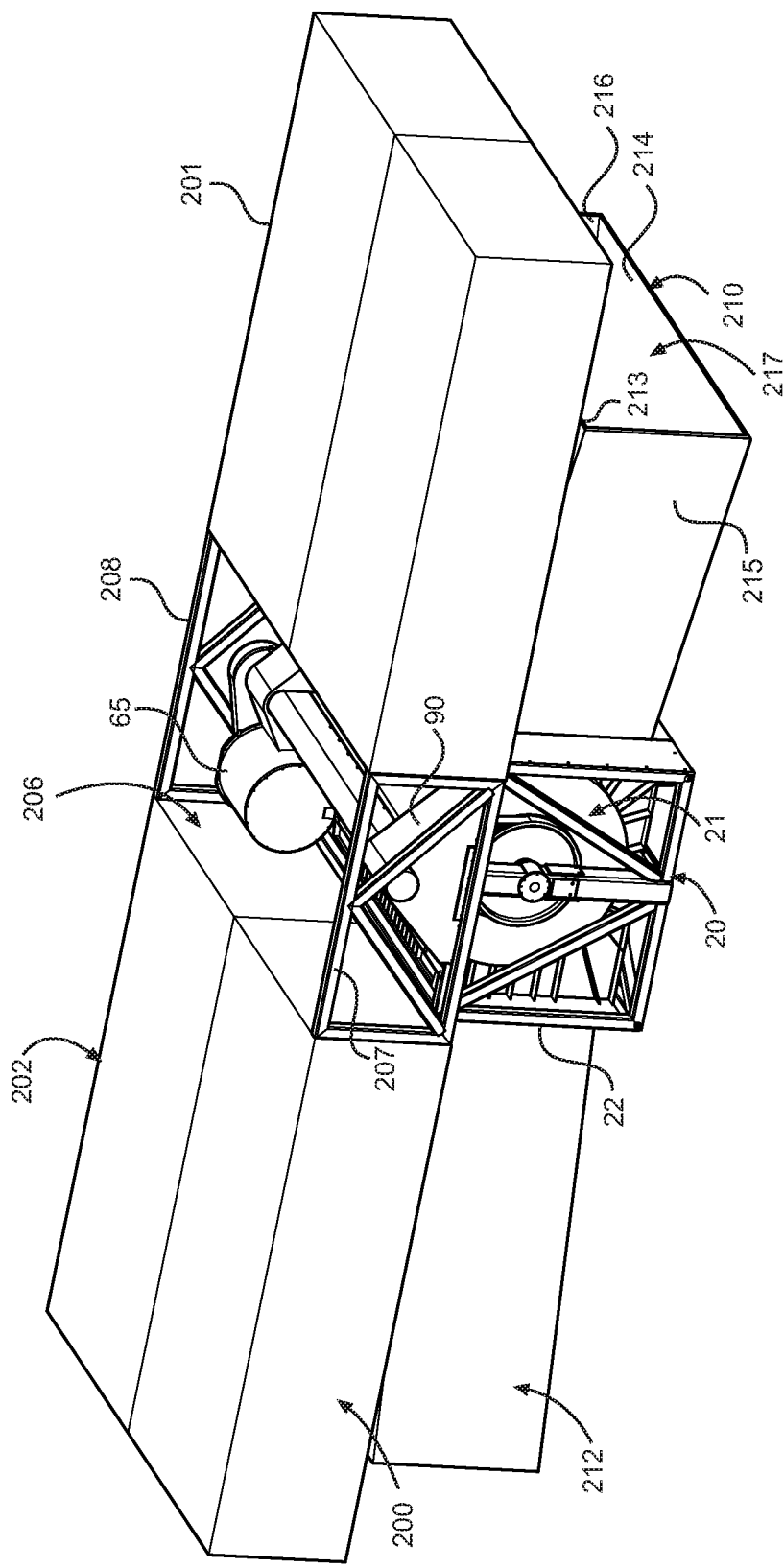
FIG. 19 is a front perspective view of a flow channel housing similar to FIG. 16 having the turbine assembly of FIG. 1 mounted therein wherein the housing and turbine assembly are supported by a flotation barge structure such that the turbine assembly may be deployed in tidal areas or deep rivers and streams.
Figure 20:
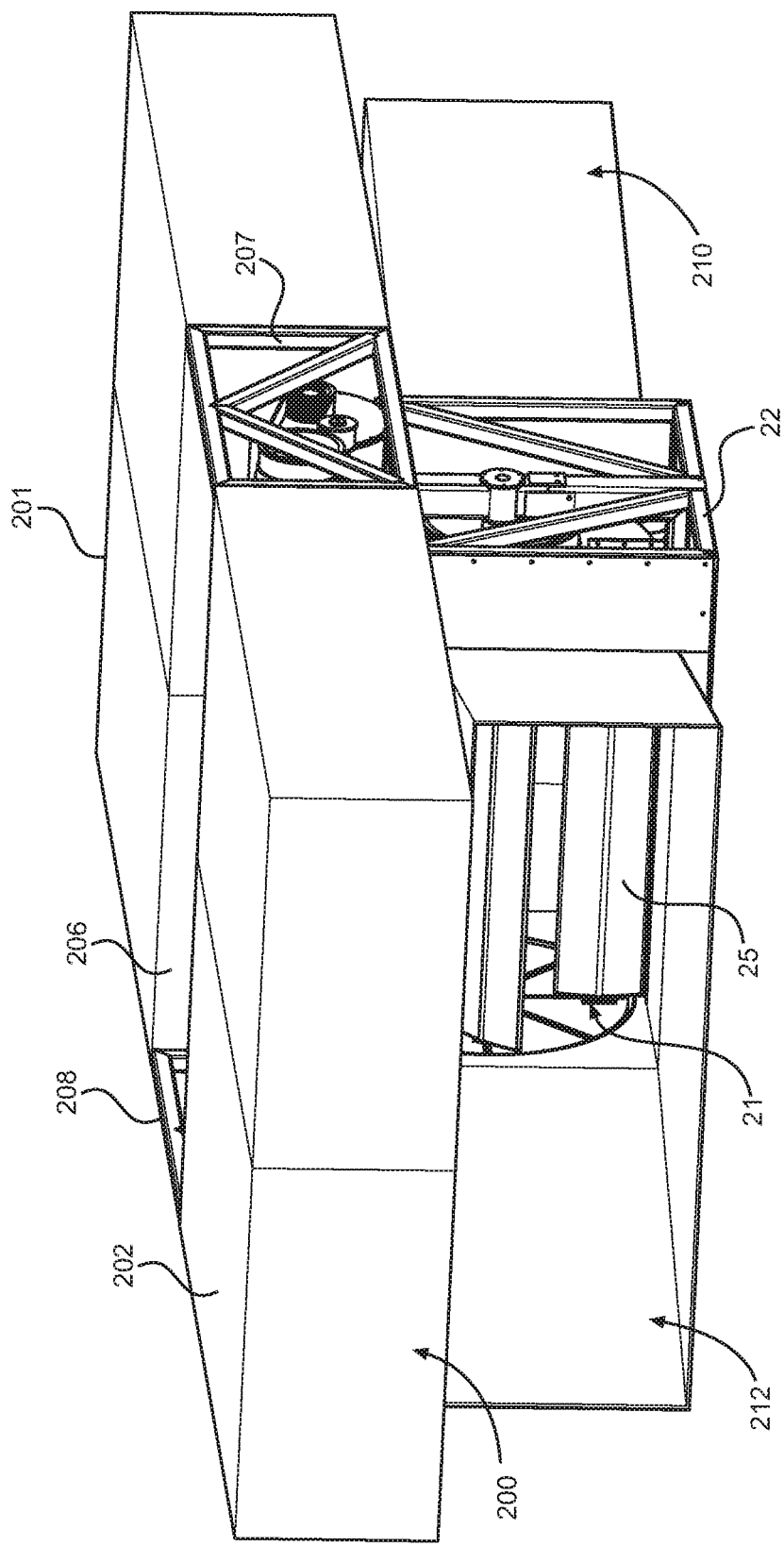
FIG. 20 is a front perspective view of the flotation barge structure of FIG. 19 showing portions of the rotor of the turbine from an inlet end of the housing.
Figure 21:
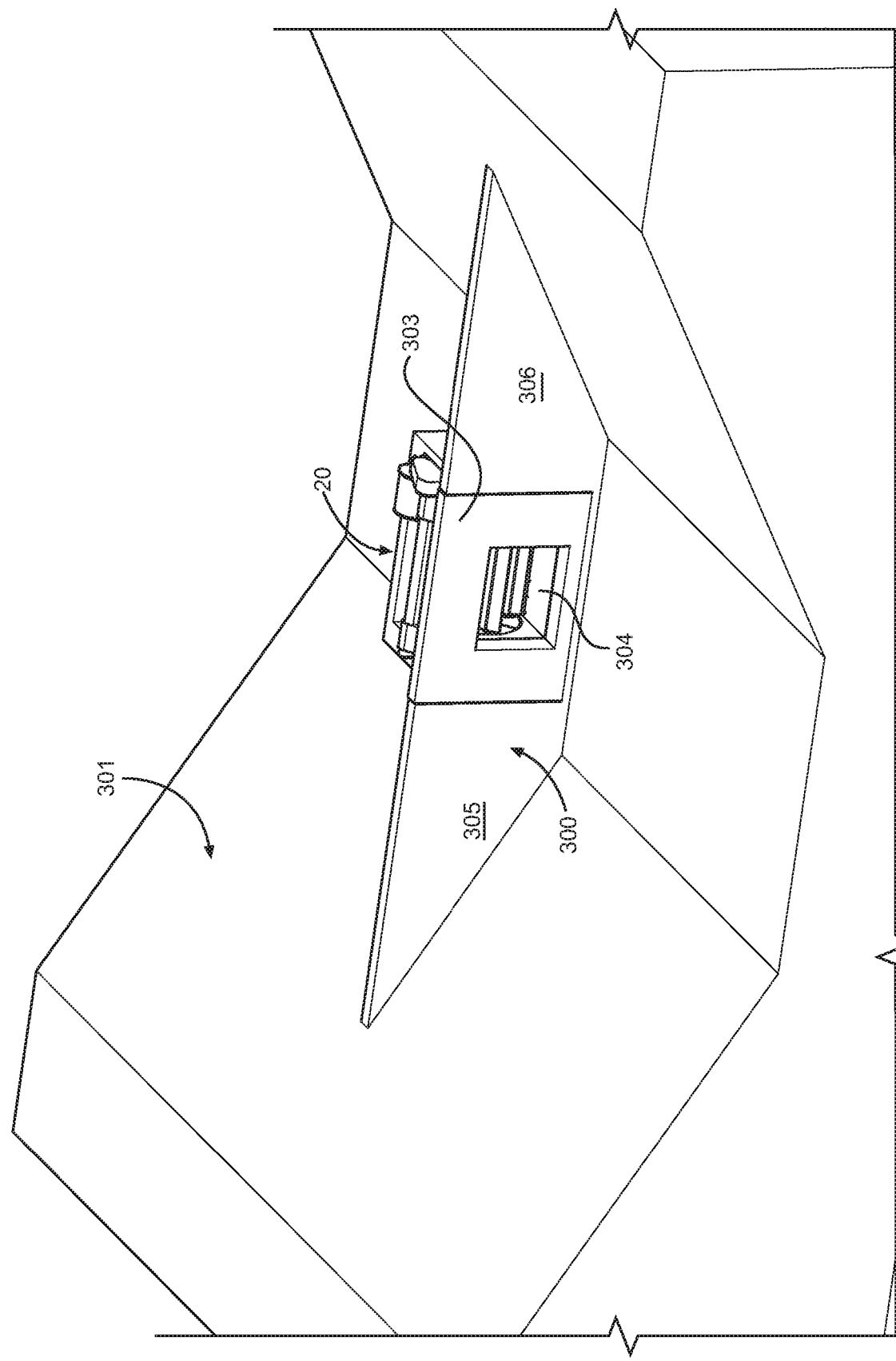
Figure 22:
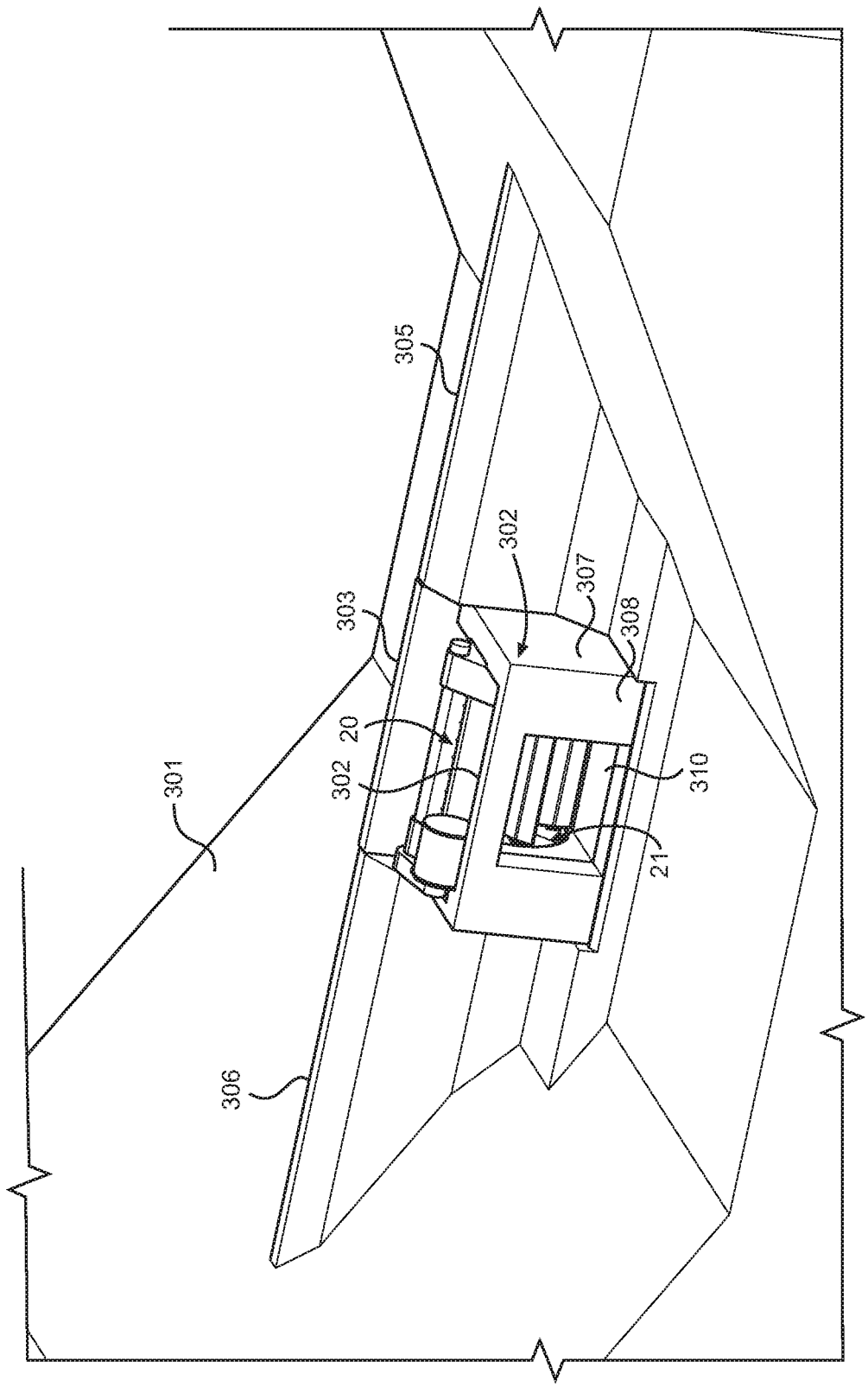
FIG. 22 is a rear perspective view of the weir structure and turbine assembly of FIG. 21 showing portions of the turbine rotor relative to the discharge outlet in the weir structure.
Figure 23:
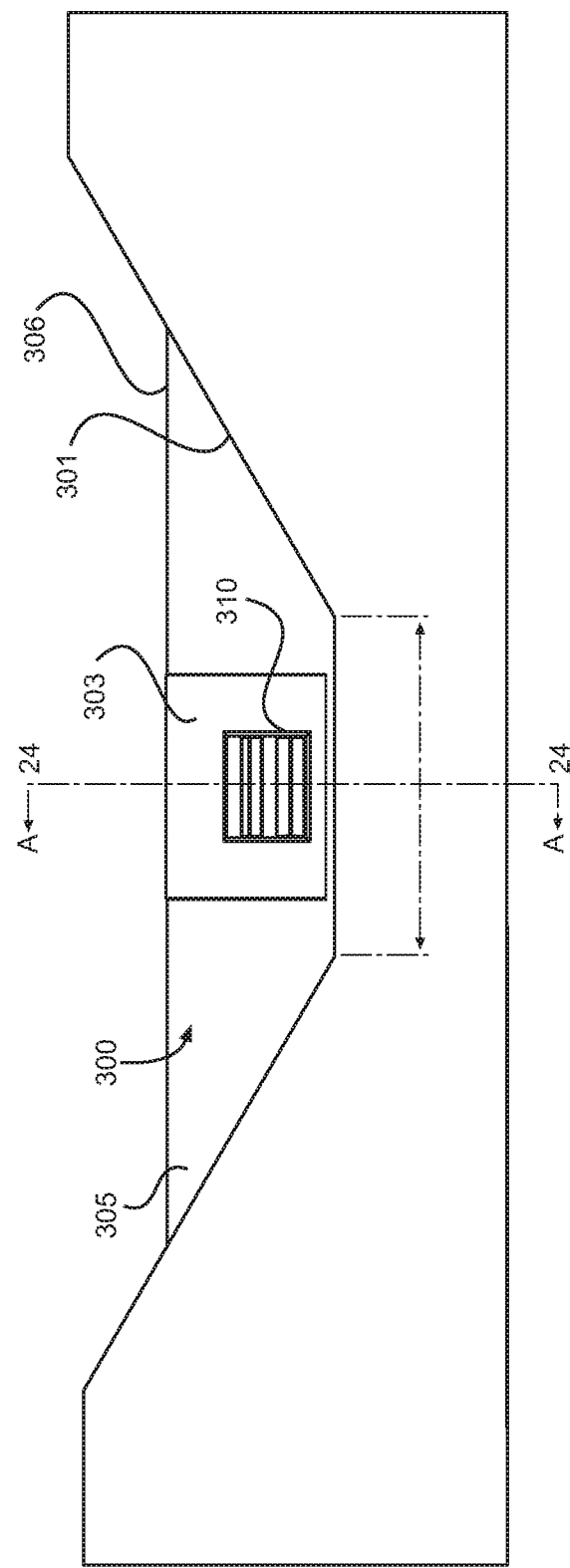
FIG. 23 is a front elevation view of the weir structure of FIG. 21.
Figure 24:
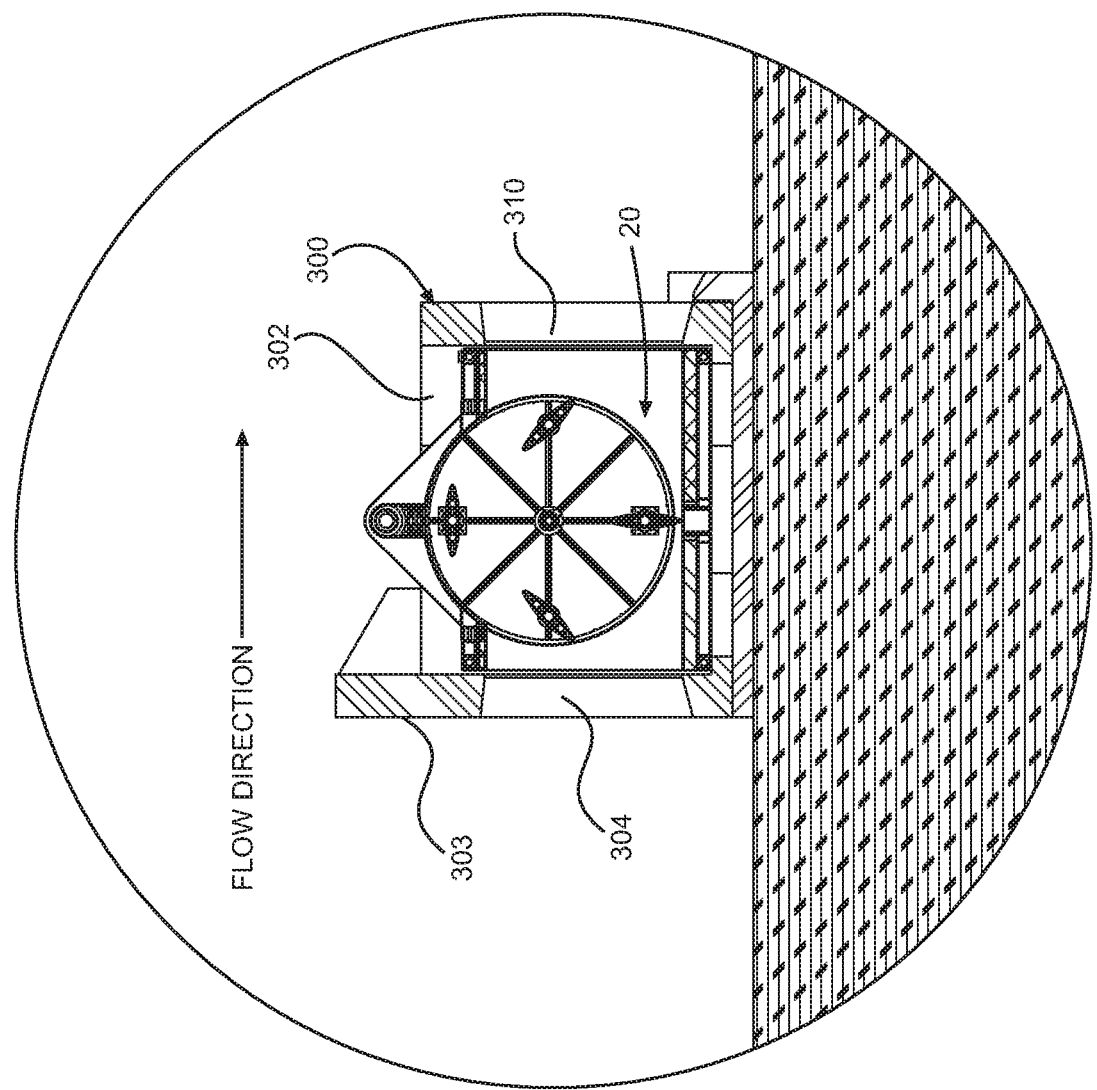
FIG. 24 is a cross sectional view taken along lines 24-24 of FIG. 23.

With reference to FIGS. 19 and 20 a turbine assembly 20 is shown mounted to a barge or other floating structure 200 having a hull structure which is shown as being relatively flat on both the forward and rear deck portions 201 and 202 and having relative flat side and bottom hull portions 204 and 205. As with the previous embodiment, an open top chamber 206 is provided between the front and rear deck and side and hull portions of a size to receive the turbine assembly as shown. The two floating portions of the structure 200 are mounted to a common connecting and open pair of side frames 207 an 208. Inwardly extending support flanges, not shown, extend inwardly of the side frames for engaging and supporting the support frame 22 of the turbine assembly as the assembly is lowered within the open top chamber 206. It should be noted that the hood 90 of the turbine assembly is mounted within the upper portion of the opening in the float structure to insure the air pocket space is retained therein. That is, the bottom wall of the deck portions 201 and 202 extend below the level of the turbine hood.

The structure 200 also includes an inlet duct 210 and an outlet or discharge duct 212 through which water enters and exits from the rotor chamber of the turbine assembly 20. The ducts align with the inlet and discharge openings that communicate with the rotor chamber of the turbine assembly. The upper and lower walls 213 and 214 and the opposite side walls 215 and 216 of the inlet duct are tapered inwardly toward one another along a length of the duct from an open end 217 thereof for creating a venturi flow effect to accelerate the flow of water into the rotor chamber to maximize forces applied against the rotor blades as water passes through the turbine during use. The discharge duct may also have upper and lower and opposite side walls that taper outwardly from one another from the discharge opening from the rotor chamber to the outlet opening 219 of the discharge duct. The inlet and discharge ducts may be bolted or otherwise secured to the hull portions of the floating structure 200. The structure 200 may be formed of composite plastics, metals and the like.

With reference to FIGS. 21-24, a weir structure 300 is shown mounted or constructed in a natural or man-made channel or canal 301 having a central open top housing 302 having an upper opening 302' of a size to cooperatively receive a turbine assembly 20 therein when being lowered into the housing. A front wall 303 of the housing extends vertically above the remainder of the housing 302 and includes an inlet opening 304 there through that aligns with the opening into the rotor chamber of the turbine assembly. The side and upper and lower walls of the opening 304 are tapered inwardly from the front to the back of the wall 303 to provide a venturi flow effect to water passing through the opening and into the rotor chamber, see FIG. 24. A pair of outwardly oriented solid weir side walls 305 and 306 extend from the front wall 303 to the tapered walls of the channel or canal 301. The weir walls create a dam surface for elevating water levels to a height where the water flow will flood the opening 304 into the housing to maximize water flow and velocity into the turbine rotor housing. The housing 302 also has opposite side walls 307 and a rear wall 308 having a discharge opening 310 there through. The weir structure is made from metal, concrete, and/or plastic composite blends.

With reference to FIGS. 25 and 26, a turbine assembly 20 is positioned within an open top housing 401 of a cast concrete venturi base structure 400 for use in tidal or large river applications is shown. As with the previous turbine assembly support structures, the structure 400 has a base 402 and the housing has opposing side walls 403 and 404, an inlet end 405 having a venturi shaped inlet opening 406 having inwardly converging walls for directing water flow into a rotor chamber of the turbine assembly. After driving the rotor 21 by water force on the blades 25, the water passes to a discharge outlet 407 having outwardly oriented flow guide walls 400 for directing the water flow downstream of the turbine assembly. Four anchoring blocks 410 are provided at the four corners of the base for retaining the structure 400 in position when deployed.

As shown in FIG. 26, a flow channel 408 through the rotor of the turbine assembly is maintained at a level below the uppermost blade of the rotor so that no water resistance is encountered by the uppermost blade as it moves through an air pocket maintained in the upper hood portion 90 of the rotor chamber as previously described herein. The rotor 21 rotates clockwise in FIG. 26. The upper portion of the housing is reinforced by a steel frame including vertical struts and horizontal members, 412 and 414, respectively.

From the foregoing, the turbine assemblies 20 and 120 can be used with substantially any moving water source, as previously noted herein, and are especially designed and constructed to be used in remote areas to supply sources of power where other electrical power sources are not available. Further, the turbine assemblies are designed to be used in areas having low flow rate water supplies. The turbine assemblies may be used as stand-alone structures situated between and anchored relative to flow directing walls for introducing water flow into the turbine inlets to the rotor or may be used with housings or support structures described herein such that the turbine assemblies may easily installed within vertically accessible chambers by lowering a turbine assembly directly into such chambers without the need to disassemble the turbines. In a like manner, the turbine assemblies are easily removed from the housings or support structures by simply being lifted from engagement with such structures.

The invention claimed is:
1. A horizontal axis water turbine for generating electrical power comprising,
　a rotor assembly including
　　a rotor mounted within a support frame so as to rotate about a horizontal axis, the rotor including
　　　a pair of spaced end plate assemblies that are connected by a plurality of horizontally oriented blades each being mounted so as to rotate with respect to and between the pair of end plate assemblies, an interior central timing pulley, peripheral interior timing pulleys, and one of an interior timing chain or timing belt, all mounted within an interior space of each end plate assembly of the pair of end plate assemblies, wherein each peripheral interior timing pulley of said peripheral interior timing pulleys is operably connected to a corresponding blade of the plurality of blades, and the one of the interior timing chain or timing belt drivingly engages the interior central timing pulley and the peripheral interior timing pulleys to rotate with the blades, the rotor being supported by and allowed to rotate about a pair of stub axles, each stub axle of the pair of stub axles fixed to the support frame, extending through a corresponding end plate assembly of the pair of end plate assemblies, and mounted to to a corresponding interior central timing pulley to drive a corresponding one of the interior timing chain or timing belt, a pair of exterior large timing pulleys, each said end plate assembly connected to a corresponding exterior large timing pulley of the pair of exterior large timing pulleys, each of the exterior large timing pulleys driving a corresponding exterior drive chain or belt of a pair of exterior drive chains or belts, each of the corresponding exterior drive chains or belts connected to an idler shaft that rotationally connects the pair of external large timing pulleys, a rotor housing mounted to the support frame and about the rotor and having an inlet portion directing water into the rotor to engage the blades to rotate the rotor about the horizontal axis and outlet portion for discharging water from the rotor, the rotor housing including a hood portion mounted over the rotor and providing an air space within the housing above an upper portion of the rotor such that when a blade is positioned along the upper portion of the rotor as the rotor is rotating, such blade is located within the air space above any water passing through the rotor.

2. The horizontal axis water turbine for generating electrical power of claim 1 wherein the inlet portion of the housing includes spaced side walls that taper toward one another from an inlet opening toward a discharge opening adjacent the rotor to thereby create a venturi flow of water through the rotor, the discharge opening of the inlet portion having a width substantially equal to that of the rotor blades and a upper edge which is below the air space within the rotor hood portion.

3. The horizontal axis water turbine for generating electrical power of claim 1 wherein the interior timing chains or timing belts and interior timing pulleys are configured and oriented within the end plate assemblies such that the plurality of rotor blades are rotated substantially at a ratio of two to one with respect to the rotor.

4. The horizontal axis water turbine for generating electrical power of claim 1 including a drive output gear mounted to the idler shaft, an electrical generator having a drive input pulley, and another one of a belt or chain connected between the drive output gear and the drive input pulley.

5. The horizontal axis water turbine for generating electrical power of claim 1 outer ends of the rotor stub drive shafts are supported in bearings mounted within bearing housings mounted to upper vertically oriented frame components of the support frame, the bearing housing and upper vertically oriented frame components being disconnected from the support frame to permit the rotor to be separated from the support frame by being raised from an open top portion of the support frame.

6. The horizontal axis water turbine for generating electrical power of claim 1 wherein the interior space of the end plate assemblies are sealed from an exterior thereof such that the interior space may be filled with a lubricating liquid.

7. The horizontal axis water turbine for generating electrical power of claim 1 wherein the rotor includes central tubes or shafts having outer end portions that are connected to the interior timing pulleys such that the such that the blades are directly driven by the interior timing pulleys.

8. The horizontal axis water turbine for generating electrical power of claim 1, wherein the interior timing pulleys comprise smaller outer timing pulleys oriented around a central interior timing pulley, wherein the one of the interior timing chain or timing belt for each end plate assembly is routed around the smaller outer idler pulleys and around the central interior timing pulley mounted to each of the central stub axles, and the central interior timing pulley has a number of teeth thereon in relation to the outer timing pulleys such that the outer timing pulleys rotate at a ratio of two to one relative to the central interior timing pulley.

9. The horizontal axis water turbine for generating electrical power of claim 1 including a plurality of spaced permanent magnets mounted adjacent a peripheral edge of each of the end plate assemblies, and a plurality of stator coil sections mounted to the rotor such that the permanent magnets interact with the stator coil sections as the rotor turns to generate electrical energy.

10. The horizontal axis water turbine for generating electrical power of claim 9 including a support structure for supporting the rotor assembly within water, the support structure including an open top housing of a size to receive the rotor assembly therein, the support structure including a water inlet channel having an inlet opening and a discharge opening and a water outlet channel having a water discharge opening, the inlet channel having opposite side walls that converge toward one another from the inlet opening to the discharge opening so as to establish a venturi flow effect to water passing through the rotor with the water passing through the rotor being discharge through a discharge opening of a water discharge channel of the support structure.

11. The horizontal axis water turbine for generating electrical power of claim 9 including screen grates covering the inlet opening and discharge opening of water inlet channels and water discharge channels.

12. The horizontal axis water turbine for generating electrical power of claim 9 including a support structure for supporting the rotor assembly within water having a floating platform having an opening there through of a size to receive the turbine assembly partially therein, a framework mounted below the opening for supporting the rotor portion of the rotor assembly below the floating platform with the hood of the rotor housing being above the framework, the support structure including a water inlet channel mounted below the floating platform so as to be aligned with the framework and having an inlet opening and a discharge opening and a water outlet channel mounted below the floating platform as to be aligned with the framework and having a water discharge opening, the inlet channel having opposite side walls that converge toward one another from the inlet opening to the discharge opening so as to establish a venturi flow effect to water passing through the rotor with the water passing through the rotor being discharged through a discharge opening of a water discharge channel of the support structure.

13. The horizontal axis water turbine for generating electrical power of claim 9 including a support structure for supporting the rotor assembly within water including a front weir wall structure for building a depth of water in front of the wall structure, an inlet opening in the front weir wall to an open top housing of a size to receive the rotor assembly therein, and a discharge opening in the open top housing.

14. The horizontal axis water turbine for generating electrical power of claim 9 including a support structure for supporting the rotor assembly within water including a base platform, an open top housing of a size to receive the rotor assembly therein, the support structure including an inlet channel having inwardly tapered side walls for creating a venturi flow through the rotor assembly and a discharge channel for water passing through the rotor assembly, and weights for anchoring the support structure within water.

15. The horizontal axis water turbine for generating electrical power of claim 1 including a support structure for supporting the rotor assembly within water, the support structure including an open top housing of a size to receive the rotor assembly therein, the support structure including a water inlet channel having an inlet opening and a discharge opening and a water outlet channel having a discharge opening, the inlet channel having opposite side walls that converge toward one another from the inlet opening to the discharge opening so as to establish a venturi flow effect to water passing through the rotor with the water passing through the rotor being discharge through a discharge opening of a water discharge channel of the support structure.

16. The horizontal axis water turbine for generating electrical power of claim 15 including screen grates covering the inlet opening of the water inlet channel and the discharge opening of the outlet channel.

17. The horizontal axis water turbine for generating electrical power of claim 1 including a support structure for supporting the rotor assembly within water having a floating platform having an opening there through of a size to receive the turbine assembly partially therein, a framework mounted below the opening for supporting the rotor portion of the rotor assembly below the floating platform with the hood of the rotor housing being above the framework, the support structure including a water inlet channel mounted below the floating platform so as to be aligned with the framework and having an inlet opening and a discharge opening and a water outlet channel mounted below the floating platform as to be aligned with the framework and having a water discharge opening, the inlet channel having opposite side walls that converge toward one another from the inlet opening to the discharge opening so as to establish a venturi flow effect to water passing through the rotor with the water passing through the rotor being discharge through a discharge opening of a water discharge channel of the support structure.

18. The horizontal axis water turbine for generating electrical power of claim 1 including a support structure for supporting the rotor assembly within water including a front weir wall structure for building a depth of water in front of the wall structure, an inlet opening in the front weir wall to an open top housing of a size to receive the rotor assembly therein, and a discharge opening in the open top housing.

19. The horizontal axis water turbine for generating electrical power of claim 1 including a support structure for supporting the rotor assembly within water including a base platform, an open top housing of a size to receive the rotor assembly therein, the support structure including an inlet channel having inwardly tapered side walls for creating a venturi flow through the rotor assembly and a discharge channel for water passing through the rotor assembly, a weight for anchoring the support structure within water.

* * * * *